United States Patent
Smadi et al.

(10) Patent No.: US 9,532,193 B2
(45) Date of Patent: Dec. 27, 2016

(54) CHANGING TOPOLOGY OF WIRELESS PEER-TO-PEER GROUP

(71) Applicant: BlackBerry Limited, Waterloo (CA)

(72) Inventors: Mohammed Nawaf Smadi, Ancaster (CA); Vytautas Robertas Kezys, Ancaster (CA); Ghada Badawy, Burlington (CA); James Randolph Winter Lepp, Ottawa (CA); Michael Peter Montemurro, Toronto (CA); Stephen McCann, Southampton (GB); David Philip Hole, Southampton (GB)

(73) Assignee: BlackBerry Limited, Waterloo, Ontario (CA)

( * ) Notice: Subject to any disclaimer, the term of this patent is extended or adjusted under 35 U.S.C. 154(b) by 280 days.

(21) Appl. No.: 14/213,002

(22) Filed: Mar. 14, 2014

(65) Prior Publication Data

US 2015/0264123 A1 Sep. 17, 2015

(51) Int. Cl.
*G06F 15/16* (2006.01)
*H04W 4/12* (2009.01)
(Continued)

(52) U.S. Cl.
CPC ............ *H04W 4/12* (2013.01); *H04L 12/1822* (2013.01); *H04L 51/046* (2013.01); *H04W 84/20* (2013.01);
(Continued)

(58) Field of Classification Search
CPC . H04L 67/1002; H04L 67/1008; H04L 67/104
See application file for complete search history.

(56) References Cited

U.S. PATENT DOCUMENTS

| 2005/0021793 A1 | 1/2005 | Kubsch et al. |
| 2008/0168182 A1* | 7/2008 | Frank ........................ G06F 1/12 709/248 |

(Continued)

FOREIGN PATENT DOCUMENTS

| WO | 2012/083080 | 6/2012 |
| WO | 2013/162496 | 10/2013 |

OTHER PUBLICATIONS

International Search Report and Written Opinion of the International Searching Authority issued in International Application No. PCT/IB2015/051773 on Jun. 10, 2015; 9 pages.

*Primary Examiner* — Brian J Gillis
*Assistant Examiner* — Kamran Mohammadi
(74) *Attorney, Agent, or Firm* — Fish & Richardson P.C.

(57) ABSTRACT

A device in a peer-to-peer (P2P) group has the role of group owner. A different device in the P2P group may take on the role of group owner without ending the P2P group and create a new P2P group. Multiple P2P groups may be merged into a single P2P group. A single P2P group may be split into multiple independent P2P groups, each with its own group owner. A group owner of a P2P group may notify the client devices in the P2P group that it is about to leave the P2P group. A client device in a P2P group may be appointed in a new role of backup group owner, to take on the role of group owner in the event of a departure of the group owner, thereby providing continuity. Techniques for maintaining upper layer continuity through changes in topology of P2P groups are disclosed.

3 Claims, 15 Drawing Sheets

(51) Int. Cl.
*H04L 12/58* (2006.01)
*H04L 12/18* (2006.01)
*H04W 84/20* (2009.01)
H04W 4/00 (2009.01)
H04W 4/08 (2009.01)
H04W 8/00 (2009.01)

(52) U.S. Cl.
CPC ............... *H04W 4/008* (2013.01); *H04W 4/08* (2013.01); *H04W 8/005* (2013.01)

(56) References Cited

U.S. PATENT DOCUMENTS

| | | | | |
|---|---|---|---|---|
| 2012/0134349 | A1* | 5/2012 | Jung | H04W 8/005 370/338 |
| 2012/0158839 | A1* | 6/2012 | Hassan | H04W 8/005 709/204 |
| 2014/0019513 | A1* | 1/2014 | Han | H04L 29/08531 709/202 |
| 2014/0082365 | A1* | 3/2014 | Everhart | H04L 9/0833 713/175 |
| 2014/0091987 | A1* | 4/2014 | Lee | H04L 65/00 345/2.3 |
| 2014/0223019 | A1 | 8/2014 | McCann et al. | |
| 2015/0163300 | A1* | 6/2015 | Kumar | H04L 67/1046 709/205 |
| 2015/0181165 | A1* | 6/2015 | Iltus | H04N 7/15 348/14.09 |
| 2015/0223029 | A1* | 8/2015 | Kanno | H04W 4/08 370/254 |

* cited by examiner

CHANGING TOPOLOGY OF WIRELESS PEER-TO-PEER GROUP

TECHNICAL FIELD

This disclosure relates to the technical field of peer-to-peer wireless communications and, in particular, to devices forming a wireless peer-to-peer group.

BACKGROUND

The Wi-Fi® Peer-to-Peer (P2P) Technical Specification first published in 2010 allows Wi-Fi® device-to-device connectivity. This functionality is entitled "Wi-Fi Direct™" The Specification describes the functionality for Wi-Fi Direct basic operation including: Discovery, Pairing (including Group Formation and P2P Invitation), Connectivity, Power Management, Group Management, and Coexistence.

BRIEF DESCRIPTION OF DRAWINGS

Some embodiments are described with respect to the following figures.

DETAILED DESCRIPTION

Figure 1:
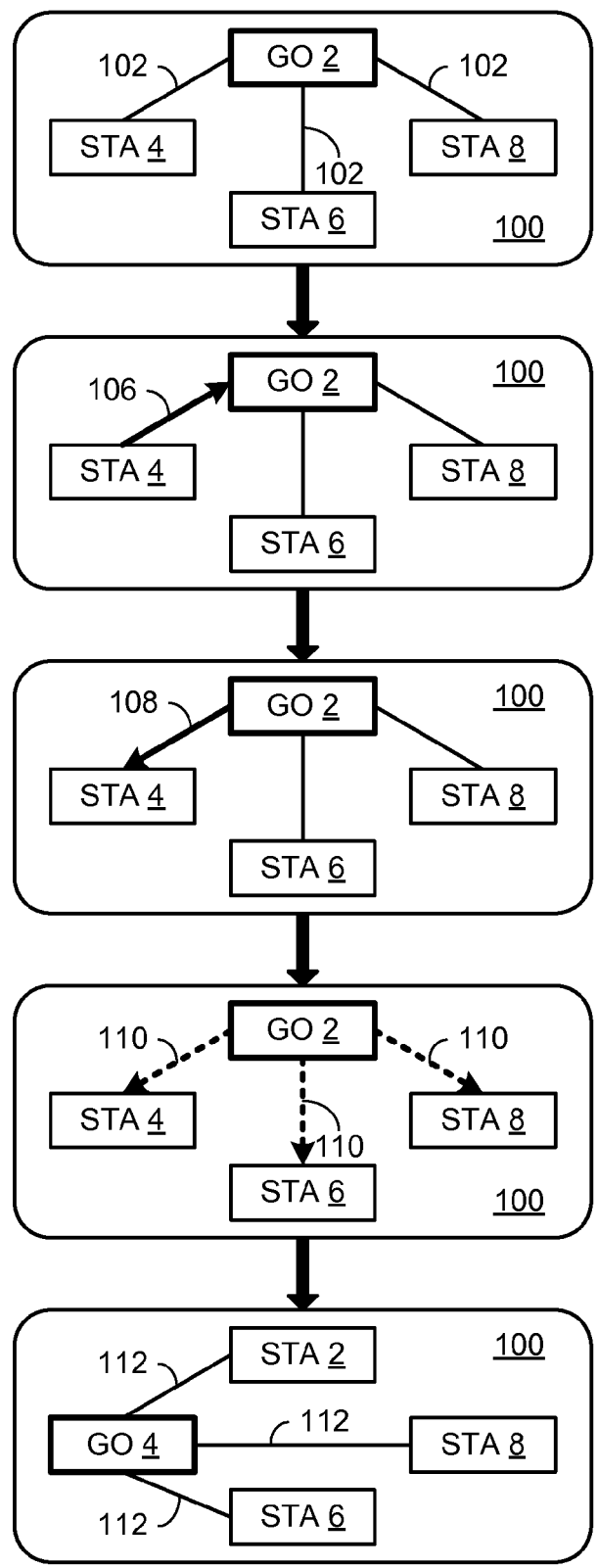
FIGS. 1-4 illustrate four alternate example messaging procedures for switching the group owner (GO) of a peer-to-peer (P2P) group.

Within a P2P group, a device may have the role of Group Owner (GO) or the role of client. A P2P group consists of a single GO device (that is, the device having the role of GO within that P2P group) and zero or more client devices (that is, devices having the role of client within that P2P group). Within a P2P group, the devices address each other by their self-generated P2P interface addresses. The topology of the P2P group is the way the devices in the group are interrelated; that is, which device has the role of GO and which devices (if any) have the role of client.

An optional P2P Invitation Procedure may be used by a GO device to invite another device to become a client in its P2P group, or by a client device to invite another device to become a client in the P2P group of which it is a member. The invitation is sent by way of a P2P Invitation Request message, though the contents of the message depend on the role of the sending device. An invited device responds to the P2P Invitation Request with a P2P Invitation Response message. The P2P Invitation Response message includes a Status indication of success (that is, the invited device accepts the invitation to join the P2P group) or failure (that is, the invited device declines the invitation).

The GO device of a P2P group is required to perform a number of additional operations that client devices in the P2P group do not need to do. In particular, the GO device operates similarly to an access point (AP) in an infrastructure basic service set (BSS). This means that the GO device has more responsibilities and maintains more connections than any other of the devices in the P2P group. In some cases, this may result in the GO device consuming more power during operation than if that device did not have the role of GO.

Currently, changing which device in a P2P group has the role of GO is not possible without ending the P2P group and creating a new P2P group. The Wi-Fi® P2P Technical Specification first published in 2010 allows the determination of the GO device only during the "Group Formation" phase. This is a pre-association state and no similar function exists after association of the devices that form the P2P group.

Switching the GO of an Existing P2P Group

Consider a scenario in which a first person is carrying a mobile telephone, a smart watch and smart glasses. All three devices are connected in a P2P group, with the mobile telephone having the role of GO of the P2P group, and the smart watch and smart glasses having the role of client. The first person carries this network of devices as she enters her car. It may be desirable for the mobile telephone to connect to the car's onboard computer so that the car can communicate with the mobile telephone to exchange application data and also so that the car can use the mobile telephone's cellular network connection for backhaul Internet access (for example, for music streaming or for firmware update downloads).

One current technique is for the existing P2P group to end and for the car's onboard computer to establish a new P2P group with the car's onboard computer having the role of GO of the new P2P group. However, from the time the existing P2P group ends until the time that the new P2P group is fully established, communications between the mobile telephone, the smart watch and the smart glasses are disrupted. Disconnection from the existing P2P group and reconnection with the new P2P group may take time. Reconnection with the new P2P group may involve user interaction, such as input of a password or passcode or selection from a menu, which will further delay the resumption of communications. This is disruptive to the upper layer protocols, the applications and the user's experience.

Another current technique is for the car's onboard computer to create a new P2P group having the role of GO and to invite the mobile telephone to join the new P2P group in the role of client, with the new P2P group running concurrently with the existing P2P group. It is possible that in this configuration the various devices can route different application's traffic over different networks provided in the different P2P groups. However, this topology is not ideal for the power usage and battery saving of either device as both the car's onboard computer and the mobile telephone are performing the operations of the GO role for a P2P group, and the wake/sleep cycle of the two P2P groups is not synchronized thus reducing time available for devices to doze as part of a power saving mechanism. Additionally, the multiple P2P groups may be configured to operate on different channels, which is feasible only if a device that is simultaneously part of multiple P2P groups is able to support multiple simultaneous channels. It is expected that enabling a device to support multiple simultaneous channels will require additional chipset complexity or cost and will further increase the battery consumption of the device.

Another technique is for the car's onboard computer to join the existing P2P group in the role of client with the mobile telephone continuing in the role of GO of the P2P group. However, it would be preferable for the car's onboard computer to take on the role of GO because it has a better, more stable, power source (bigger battery, alternator). Unfortunately, there is currently no way for the car's onboard computer to take on the role of GO of the existing P2P group instead of the mobile telephone.

As detailed below, this disclosure describes a mechanism and procedure for switching which device has the role of GO ("switching the GO") of a P2P group that is already formed.

Merging Two P2P Groups into a Single P2P Group

Consider a scenario in which a first person is in a car. The first person is carrying a mobile telephone, a smart watch and smart glasses, and those devices, together with the car's onboard computer, form a first P2P group, with the car's onboard computer having the role of GO of the first P2P group and the mobile telephone, smart watch and smart glasses having the role of client. A second person is carrying a mobile telephone and a portable gaming device that are connected in a second P2P group, with the second person's mobile telephone having the role of GO of the second P2P group. After the second person enters the car, it may be desirable for the second person's mobile telephone and the portable gaming device to join the first P2P group of the car's onboard computer.

One current technique is for both the first P2P group and the second P2P group to end, and for the various devices and the car's onboard computer to discover each other and to form a new P2P group with the car's onboard computer having the role of GO of the new P2P group. As noted above, this technique results in a gap of connectivity that is disruptive to the upper layer protocols, the applications and the user experience.

Another current technique is for the car's onboard computer to create a new P2P group having the role of GO and to invite the second person's mobile telephone and portable gaming device to join the new P2P group, which would run concurrently with the first P2P group. However, this topology is not ideal, for at least the reason that there would still be two P2P groups with the car's onboard computer having the role of GO within both of the P2P groups. It also does not achieve the stated goal of having the first person's devices and the second person's devices form a P2P group together.

As detailed below, this disclosure describes a mechanism and procedure for merging two P2P groups.

Splitting an Existing P2P Group into Multiple Independent P2P Groups

Consider a scenario in which two people are in a car, each carrying a mobile telephone and a smart watch. All these devices, together with the car's onboard computer, form a single P2P group with the car's onboard computer having the role of GO of the P2P group. A first person exits the car, taking his mobile telephone and smart watch with him. The mobile telephone and the smart watch of the first person (who is exiting the car) should remain connected with each other using Wi-Fi Direct, whilst the mobile telephone and the smart watch of the second person (who remains in the car) should remain connected with each other and with the car's onboard computer in the P2P group.

A current technique is for the devices of the first person to leave the P2P group (for example, due to going out of radio range) and then discover each other and form a new P2P group after some period of disconnection. As noted above, this technique results in a gap of connectivity that is disruptive to the upper layer protocols, the applications and the user experience.

As detailed below, this disclosure describes a mechanism and procedure for splitting a P2P group into two P2P groups.

Notification of a Departing GO and/or Appointment of a Backup GO

Currently, a P2P group continues to operate only as long as the GO device is present. If the GO device ceases to be present, for example, due to a dead battery, going out of radio range of the client devices in the P2P group, due to radio interface, or due to a departure from the current location, the P2P group will cease to exist. There is no warning to the client devices or to the applications and services running on the client devices or to the users that use the applications or services that the P2P group is about to cease. Once the GO device ceases its operation of the role of GO, the P2P group ceases to exist. The P2P group ends even if all of the client devices in the P2P group continue to operate in radio range of one another. If the client devices want to continue to communicate with one another, a new P2P group needs to be formed between them. There is a period of disconnection while the devices discover one another, negotiate roles and authenticate before the new P2P group is formed. This period of disconnection may be disruptive to the upper layer protocols, some applications or services that were running in the old P2P group (that ceased to exist) and that run in the new P2P group (once it is formed), and to the user experience.

As detailed below, this disclosure described a new role of backup GO, and a mechanism and procedure for appointing the role of backup GO to a client device that takes over the role of GO of the P2P group in the event of a departure of a GO device from the P2P group.

As detailed below, this disclosure describes a mechanism and procedure for notifying client devices in a P2P group that the GO device of the P2P group will be departing the P2P group. This early warning enables the client devices to continue operation of the P2P group, either by having the client device that was appointed the role of backup GO take over the role of GO, or by using a procedure to switch the role of GO from the departing GO device to a client device in the P2P group.

Changing Group Owner (GO) of Peer-to-Peer (P2P) Group

This disclosure describes a mechanism and procedure for switching the group owner (GO) of a P2P group that is already formed. A switch in GO changes the topology of the P2P group, in that the GO device takes on the role of client and one of the client devices in the P2P group takes on the role of GO. The role switch is accomplished whilst maintaining the upper layer state (such as the Internet Protocol (IP) address assignments) of the members of the group.

FIGS. 1-4 illustrate four alternate example messaging procedures for switching the GO of a P2P group that is already formed. In these figures, a P2P group 100 is formed of four devices (also known as "stations") (STA 2, STA 4, STA 6, and STA 8), merely as an example. The number of devices in the P2P group may be two, three, four or more than four. At the start of the procedure, the STA 2 currently acts as the GO of the P2P group 100, as illustrated by solid lines 102. By the end of the procedure, the STA 4 acts as the GO of the P2P group 100, as illustrated by solid lines 112. During the time that the STA 2 acts as the GO of the P2P group, the STA 2 is referred to as the GO 2. During the time that the STA 4 acts as the GO of the P2P group, the STA 4 is referred to as the GO 4.

In the example messaging procedure illustrated in FIG. 1, the STA 4 sends a GO Change Request message (illustrated as a solid arrow 106) directly to the GO 2 requesting to become the GO of the P2P group. The GO Change Request message is sent by the STA 4 after association. The GO 2 responds directly to the STA 4 with a GO Change Response message (illustrated as a solid arrow 108) indicating whether the GO 2 accepts or denies the request. If the request is accepted, the GO 2 broadcasts to all devices a GO Change Announcement message (illustrated as a dotted arrow 110) announcing the switch to the new GO, which is STA 4. Alternatively, the GO 2 may unicast to all or to a subset of the devices a GO Change Announcement message announcing the switch to the new GO, which is STA 4. If the GO Change Announcement message is sent only to a subset of the client devices in the P2P group, this is a form of splitting the P2P group into two P2P groups because the client devices that do not receive the message remain in the original P2P group with GO 2.

There are various factors and triggers that may lead a client device to initiate the change in GO and to become a prospective GO. One factor may be related to power supply, such as a client device's battery level or a connection to a reliable power source such as power mains. An application or service running on the client device may require the change in topology (roles) of the P2P group for some reason. Another factor may be a change in the backhaul speeds or connectivity to a Wi-Fi® infrastructure, or to a cellular network or to some other network. It is also possible that received signal strength indicator (RSSI) or performance measurements may be a factor.

Figure 2:
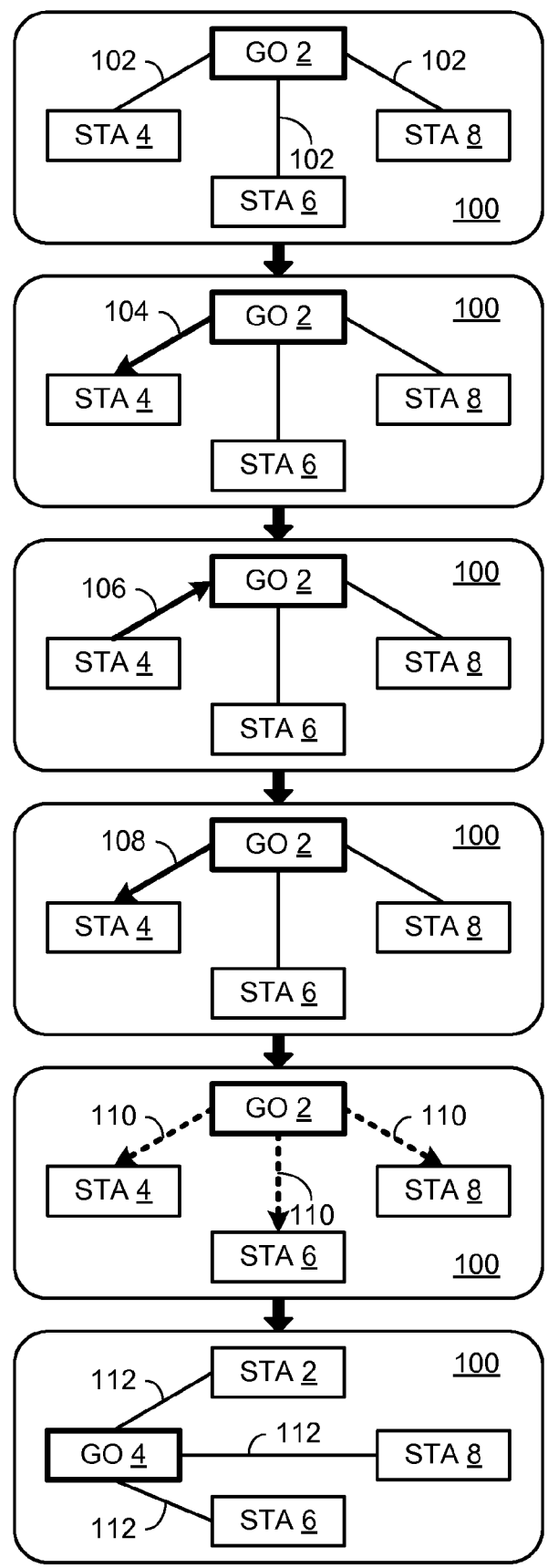

In the example messaging procedure illustrated in FIG. 2, the GO 2 (rather than the STA 4) initiates the change in the GO of the P2P group by sending a message (illustrated as a solid arrow 104) to the STA 4. That message, which may be a GO Change Request message, is sent by the GO 2 after association. Responsive to receiving the initiation message from the GO 2, the STA 4 sends a GO Change Request message (illustrated as the solid arrow 106) to the GO 2 requesting to become the GO of the P2P group. The rest of this example procedure continues as for FIG. 1.

In both of the example messaging procedures described above, the prospective GO device sends a GO Change Request message to the current GO device. If the current GO device accepts this role change, the current GO device responds with a GO Change Response message that includes an Accept status and a list of devices in the P2P group (for example using a P2P Group Info attribute as described at section 4.1.16 of the Wi-Fi® P2P Technical Specification first published in 2010). If the current GO device does not relinquish its role as GO, the current GO device responds with a GO Change Response message that includes either a Temporary Deny status or a Permanent Deny status. In the event the current GO device accepts the role change, the current GO device refrains from initiating a subsequent request to become the GO of the P2P group for at least a minimum period of time (which may be implementation-specific, specified or otherwise predetermined).

Figure 3:
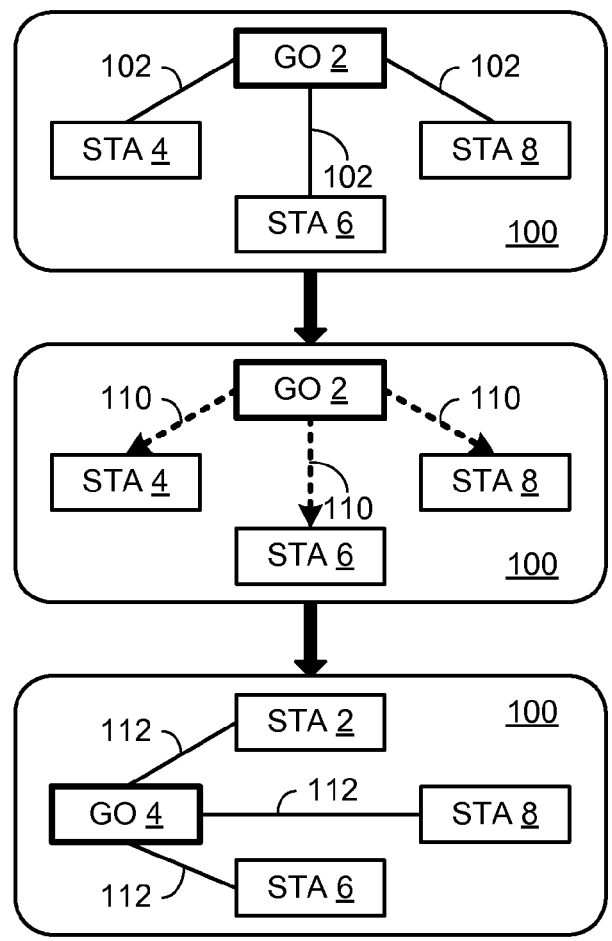

In the example messaging procedure illustrated in FIG. 3, the GO 2 autonomously and unilaterally broadcasts to all devices in the P2P group a GO Change Announcement message (illustrated as the dotted arrow 110) announcing the switch to the new GO. That is, the GO Change Announcement message identifies a client device in the P2P group as taking on the role of GO for the P2P group. The GO Change Announcement message is sent by the GO 2 after association. Alternatively, the GO 2 may unicast to all or to a subset of the devices a GO Change Announcement message announcing the switch to the new GO device, which is STA 4. If the GO Change Announcement message is sent only to a subset of the client devices in the P2P group, this is a form of splitting the P2P group into two P2P groups because the client devices that do not receive the message remain in the original P2P group with GO 2.

Figure 4:
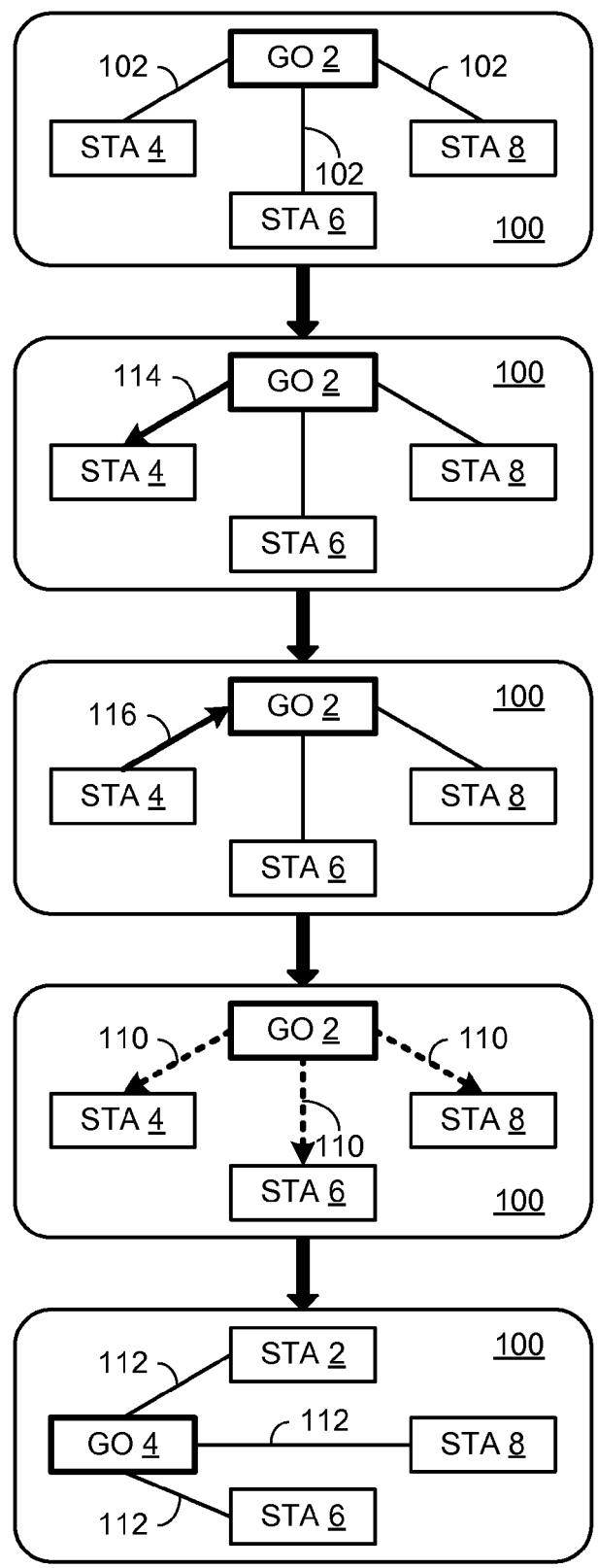

In the example messaging procedure illustrated in FIG. 4, the GO 2 (rather than the STA 4) initiates the change in the GO of the P2P group by sending a message (illustrated as a solid arrow 114) to the STA 4, requesting that the STA 4 become the new GO (that is, take on the role of GO) of the P2P group. That message is sent by the GO 2 after association. Responsive to receiving the request message from the GO 2, the STA 4 responds directly to the GO 2 with a response message (illustrated as a solid arrow 116) indicating whether the STA 4 accepts or denies the request. If the request is accepted, the GO 2 broadcasts to all devices a GO Change Announcement message (illustrated as the dotted arrow 110) announcing the switch to the new GO, which is STA 4. Alternatively, the GO 2 may unicast to all or a subset of the devices a message announcing the switch to the new GO device, which is STA 4. If the GO Change Announcement message is sent only to a subset of the client devices in the P2P group, this is a form of splitting the P2P group into two P2P groups, because the client devices that do not receive the message remain in the original P2P group with GO 2.

Regardless of the messaging procedure, a client device that receives a GO Change Announcement message and that supports GO switching will seamlessly move over to operating with the new GO device announced in that message. The current GO device (that sent the GO Change Announcement message) ceases operating as the GO, and the new GO device now operates as the GO for the P2P group.

The GO Change Announcement message may include a parameter called the GO Switch Count field. Based on this value, the receiving stations switch to the new GO immediately, any time, or after a specific number of target beacon transmission times (TBTTs). In the latter case, the current GO device will remain operating as the GO until the indicated time, and the new GO device will begin operating as the GO starting from the indicated time.

When devices in the P2P group receive the GO Change Announcement message, they begin to follow the beacon countdown. Once the beacon countdown reaches 0, the devices (including the current GO device) switch to operate with the new GO device to which they have been directed. Alternatively, the beacon countdown could be implemented as a counter counting up to the received value. This enables all devices to switch simultaneously. By having all devices in the P2P group switch to the new GO device at the same time, the upper layer networking services can be preserved. For example, IP address allocations will remain the same.

Any legacy client devices in the P2P group that do not support GO switching will have their connections with the current GO device fail once the current GO device stops operating as the GO of the P2P group. The legacy client devices can then reconnect to the new GO device as if the P2P group is a new P2P group. The new GO device may use the legacy P2P invitation procedure to quickly reconnect legacy client devices that do not support GO switching. These legacy client devices will see the new GO device as operating a new and different P2P group than the P2P group that they belonged to.

In the event that a client device misses the GO Change Announcement message and continues addressing traffic to the previous GO device, the previous GO device may resend the GO Change Announcement message to that client device, possibly modified to indicate an immediate switch to the new GO device.

Splitting a P2P Group

This disclosure describes a mechanism and procedure for splitting a P2P group into multiple independent P2P groups each with its own GO. In many cases, the splitting of the P2P group into multiple independent P2P groups each with its own GO is accomplished whilst maintaining the upper layer state (such as the Internet Protocol (IP) address assignments) of the members of the groups.

A single P2P group may be split into multiple independent P2P groups each with its own GO. To effect the split, the devices forming the single P2P group must determine to which one of the multiple independent P2P groups to belong after the split. In the event that the single P2P group was previously merged from two or more earlier P2P groups, the client devices and GO devices of the earlier P2P groups may store indications of the previous topology (that is, to which of the earlier P2P groups the devices belonged and which of those devices had the role of GO) and may revert to the previous topology to effect the split. Those indications may include, for example, group ID and group BSSID (the P2P interface address of the GO device). There could also be interaction with an external identifier, such as a service account (BlackBerry® ID, Google® account, Apple® ID, Amazon® account, Steam® username, or similar) such that devices registered to the same service account stay together after the split.

Various events may trigger the splitting of a P2P group. A non-exhaustive list of such events includes the current GO device going out of radio range, the GO device sending a message to all or a subset of the stations in the P2P group, expiration of timer, or user input forcing a split.

When a P2P group is splitting into two, the timing is not as important as in the case of the GO changing within a P2P group. After the new GO device for the new P2P group begins operating as the GO, the individual client devices which are moving to the new P2P group are not required to move over immediately because the GO device of the original P2P group continues to operate. Therefore the synchronicity provided by a broadcast message with a beacon countdown is not vital for the group split procedure. However, to enable the upper layers to transition as seamlessly as possible, the countdown element may still be included in the message sent to the devices that are moving. In the case where unicast messages are sent to a large number of devices, the device that is sending these messages may ensure the timing of the transmission of the unicast messages is such that the receiving devices make the switch at the same beacon timing.

Figure 5:
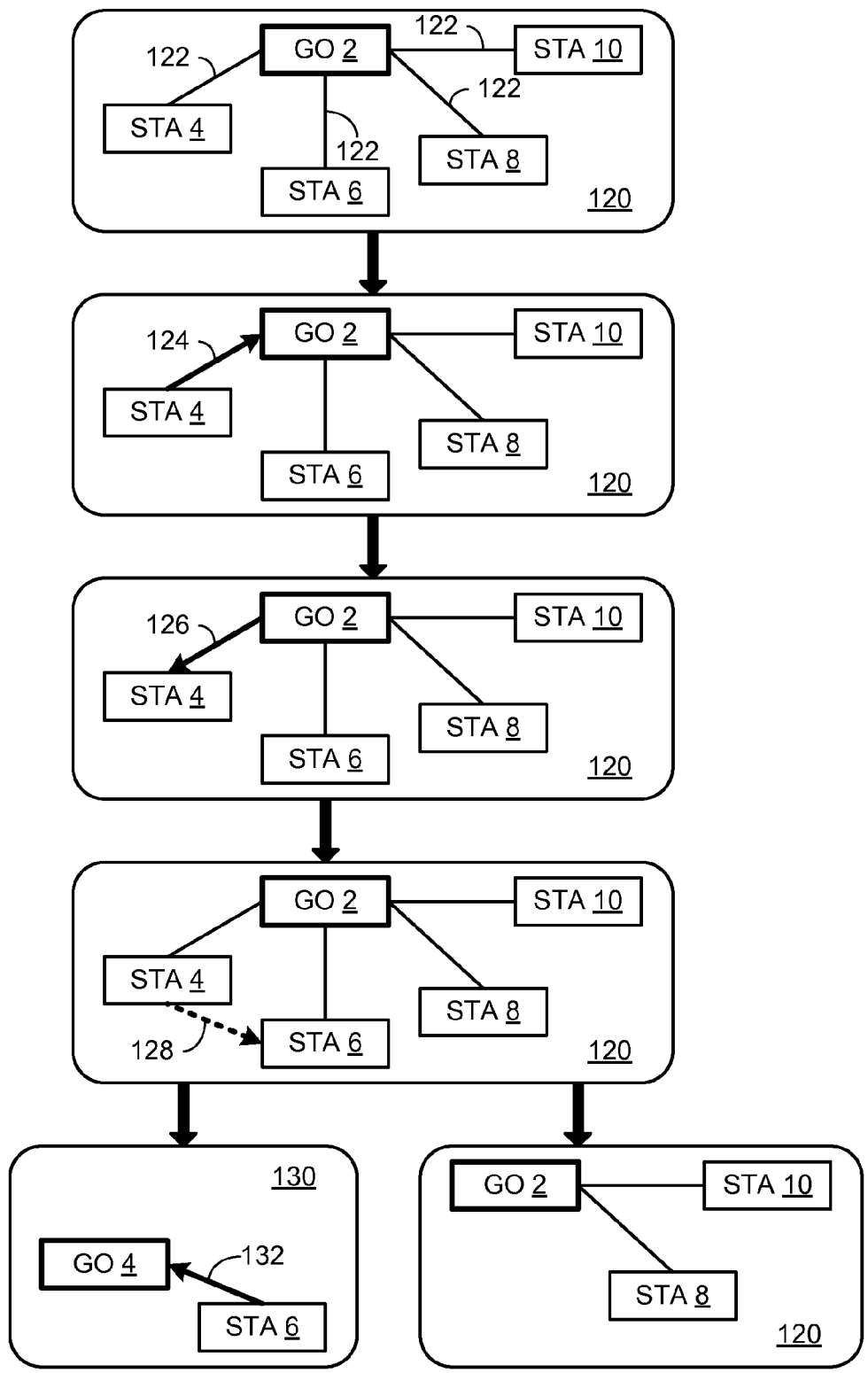
FIG. 5 illustrates an example messaging procedure for splitting a P2P group into two P2P groups.

FIG. 5 illustrates an example messaging procedure for splitting a P2P group into two P2P groups. In this figure, a P2P group 120 is formed of five devices (STA 2, STA 4, STA 6, STA 8, and STA 10) merely as an example. The number of devices in the P2P group 120 may be four, five or more than five. At the start of the procedure, the STA 2 currently acts as the GO of the P2P group 120, as illustrated by solid lines 122. The STA 2 is referred to as the GO 2.

One of the client devices in the P2P group 120 is a prospective GO that determines that it wants to be a group owner of a new group. For example, the STA 4, responsive to making this determination, sends a message (illustrated as an arrow 124) directly to the GO 2 requesting a split. If the request is approved by the GO 2, the GO 2 responds directly to the STA 4 with a message (illustrated as an arrow 126) listing all devices in the P2P group 120 that the GO 2 is prepared to relinquish to the prospective GO. The GO 2 may be prepared to relinquish all devices in the P2P group 120, or may be prepared to relinquish a subset of the stations in the P2P group 120. In the event that the GO 2 is prepared to relinquish only a subset of the stations in the P2P group 120, the GO 2 must not be part of that subset (otherwise the P2P group 120 will have no device in the role of GO).

Responsive to receiving the message from the GO 2 with the list of stations, the STA 4 may choose from the list which devices to invite and may initiate a P2P invitation procedure (as illustrated by a dashed arrow 128) to the chosen device, while operating as the GO of a new P2P group 130. For example, the GO 2 may be prepared to relinquish STA 6 and STA 8, and the GO 4 may choose to invite only STA 6.

The invited station STA 6 may respond to the P2P invitation (as illustrated by a dashed arrow 132), thus forming the P2P group 130 with the GO 4, while the GO 2, the STA 8 and the STA 10 remain in the P2P group 120.

Merging Two P2P Groups

This disclosure describes a mechanism and procedure for merging two P2P groups without ending the P2P groups and starting a new P2P group.

The decision to merge a first P2P group into a second P2P group may be made by the GO of the first P2P group. How the P2P groups decide to merge may involve user interaction, or may be automatic, or may be based on historical topology. It may be based on the type of one of the devices and its environment. For example, a car's onboard computer may be configured with a preference for being the GO, and a mobile telephone may be configured to transition peripheral devices and accessories that are in a P2P group with that mobile telephone to have a direct connection with the car's onboard computer rather than with that mobile telephone when in the environment of the car. There could also be interactions with an external identifier, such as a service account (BlackBerry® ID, Google® account, Apple® ID, Amazon® account, Steam® username, or similar) such that devices registered to the same service account merge together into a single P2P group when within radio range of each other.

A decision to merge may be triggered by one of the GO devices determining that it is about to cease operating as the GO of its P2P group. For example, this determination may be made due to an imminent loss of power (partial or complete) at the GO device, an imminent shut down of the GO device, or an imminent movement of the GO device out of radio range of the client devices in the P2P group. The GO device may trigger the merging of the P2P groups to provide continuity to the client devices in its P2P group, even though the GO device itself may not actually move to or remain in the merged P2P group.

Figure 6:
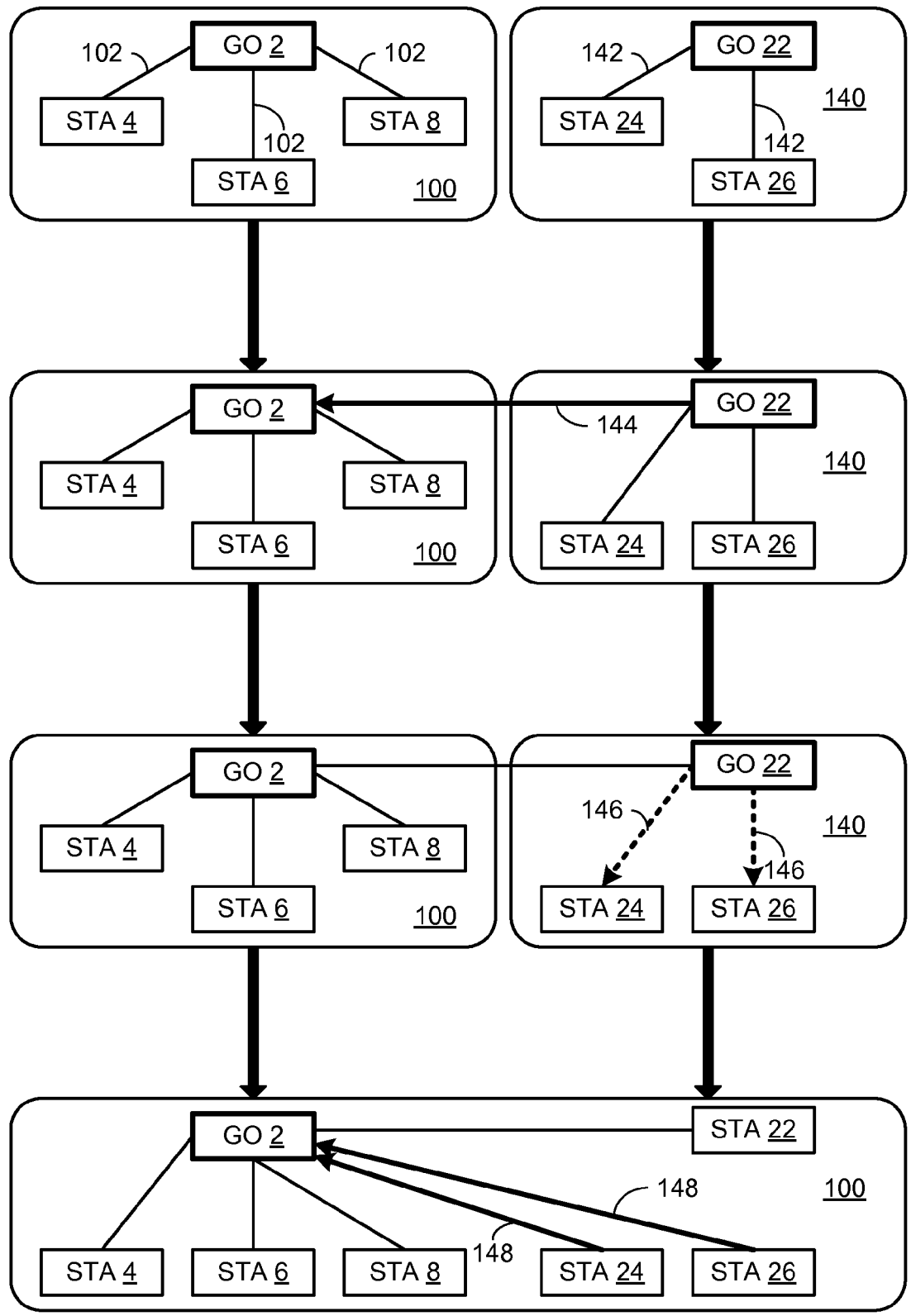
FIG. 6 illustrates an example messaging procedure for merging two P2P groups.

FIG. 6 illustrates an example messaging procedure for merging two P2P groups. In this figure the P2P group 100 is formed of four devices (STA 2, STA 4, STA 6, and STA 8), merely as an example. The number of devices in the P2P group 100 may be two, three, four or more than four. In this figure a P2P group 140 is formed of three devices (STA 22, STA 24, and STA 26), merely as an example. The number of devices in the P2P group 140 may be two, three, four or more than four.

At the start of the procedure, the STA 2 currently acts as the GO of the P2P group 100, as illustrated by solid lines 102, and the STA 22 currently acts as the GO of the P2P group 140, as illustrated by solid lines 142. The STA 2 is referred to as the GO 2. During the time that the STA 22 acts as the GO of the P2P group 140, the STA 22 is referred to as the GO 22.

The decision to merge the P2P group 140 with the P2P group 100 is made by the GO device of the P2P group 140, namely the GO 22. The GO 22, referred to as the merging GO, sends a P2P Invitation Request message (illustrated as a solid arrow 144) directly to the GO 2 of the P2P group 100. If the request is accepted (not shown), the GO 22 has completed the P2P invitation procedure and is now a client device in the P2P group 100. Responsive to the request being accepted, the GO 22 broadcasts to all devices in the P2P group 120 a GO Change Announcement message (illustrated as a dotted arrow 146) announcing the switch to the new GO device, which is the GO 2 of the P2P group 100.

Each individual client device in the P2P group 140, namely STA 24 and STA 26, will then send a P2P Invitation Request message (illustrated as a solid arrow 148) directly to the GO 2 of the P2P group 100, requesting to join the P2P group 100 in the role of client. The contents of the P2P Invitation Request messages are derived from the contents of the GO Change Announcement message received by the client devices. If the requests are accepted (not shown), the enlarged P2P group 100 is now formed of the GO 2 and the client devices STA 4, STA 6, STA 8, STA 22, STA 24, and STA 26.

Appointing a Backup GO

This disclosure describes a new role of backup GO. A client device appointed the role of backup GO takes over the role of GO of the P2P group in the event of a departure of a GO device from the P2P group, whilst maintaining the upper layer state (such as the Internet Protocol (IP) address assignments) of the remaining members of the groups.

In order to provide continuity to a P2P group if the GO device departs, the role of backup GO can be assigned to a client device in the P2P group. The backup GO device, which is a client device in the P2P group, may be appointed at the time of group formation by using the intent values that the GO device received from the client devices during the original negotiation phase. For example, an election process could be performed where each device sends its intent value, the device with the highest intent value takes on the role of GO of the P2P group and the device with the second highest intent value takes on the role of backup GO of the P2P group. Alternatively, the first device to join the P2P group in the role of client may be appointed to take on the role of backup GO of the P2P group. In another alternative, the device to most recently join the P2P group in the role of client may be appointed to take on the role of backup GO of the P2P group.

The role of backup GO may be re-appointed from time to time, or re-appointed after certain trigger events such as a topology change in the P2P group, the departure of the current backup GO device from the P2P group, a successful GO change procedure, or expiry of a timer.

Alternatively, the role of backup GO may be appointed by a manual procedure (for example, in the situation where the person using the station appointed as the backup GO is also in possession of other stations in the P2P group), or through use of an alternate technology such as near field communications (NFC) or Bluetooth®.

Using unicast signaling the GO device may inform a client device in the P2P group that it is appointed to take on the rule of backup GO and may optionally require acknowledgement from that client device ("the backup GO device"). The GO device may use unicast signaling or broadcast signaling to inform the other client devices in the P2P group of the identity of the backup GO device and may optionally require acknowledgement from the other client devices of receipt.

Alternatively, the GO device may use a single broadcast message to inform all devices (including the newly appointed backup GO) of the identity of the backup GO, and may optionally require acknowledgement of receipt from the receiving stations.

Signaling Departure of a GO

This disclosure describes a mechanism and procedure for notifying client devices in a P2P group that the GO device of the P2P group will be departing the P2P group. This early warning enables the client devices to continue operation of the P2P group, either by having the client device that was appointed the role of backup GO take over the role of GO, or by using a procedure to switch the GO from the departing GO device to a client device in the P2P group.

This notification may be triggered, for example, by one or any combination of the following events: a reduction in battery level of the GO device, a decreasing received signal strength indicator (RSSI) for signals received from client devices in the P2P group, a change in radio performance of signals received from client devices in the P2P group, physical departure of the GO device from the current location, or the power of the GO device in the process of being turned off.

If the battery level of the GO device is low or the person using the GO device is turning the power off (or turning off the Wi-Fi® components), the GO device may send a GO Departure Notification message to the client devices in the P2P group. A client device in the P2P group may receive a GO Departure Notification message from the GO device that the GO is about to run out of battery power, or is about to stop operating for some other reason.

A client device in the P2P group may detect that the GO device is about to go out of radio range and will no longer be able to communicate with the client device. The devices in the P2P group may be fixed location devices or mobile devices. A Wi-Fi® Docking Centre (WDC) or a Wi-Fi® Access Point (AP) may be a fixed location device, while a mobile telephone or Wi-Fi® Dockee (WD) may be a mobile device. Indications of whether a device in the P2P group is a fixed location device or a mobile device may be used to determine that other devices in the P2P group are moving or to predict when a mobile device will go out of radio range. For example, mobile devices may move together (within the same vehicle for example) and thus keep a relatively steady level of RSSI when communicating with one another, but have an improving or deteriorating RSSI relative to a fixed location device.

As noted above, switching the GO of a P2P group that is already formed involves the current GO device, the prospective GO device, and any other client devices in the P2P group.

Figure 7:
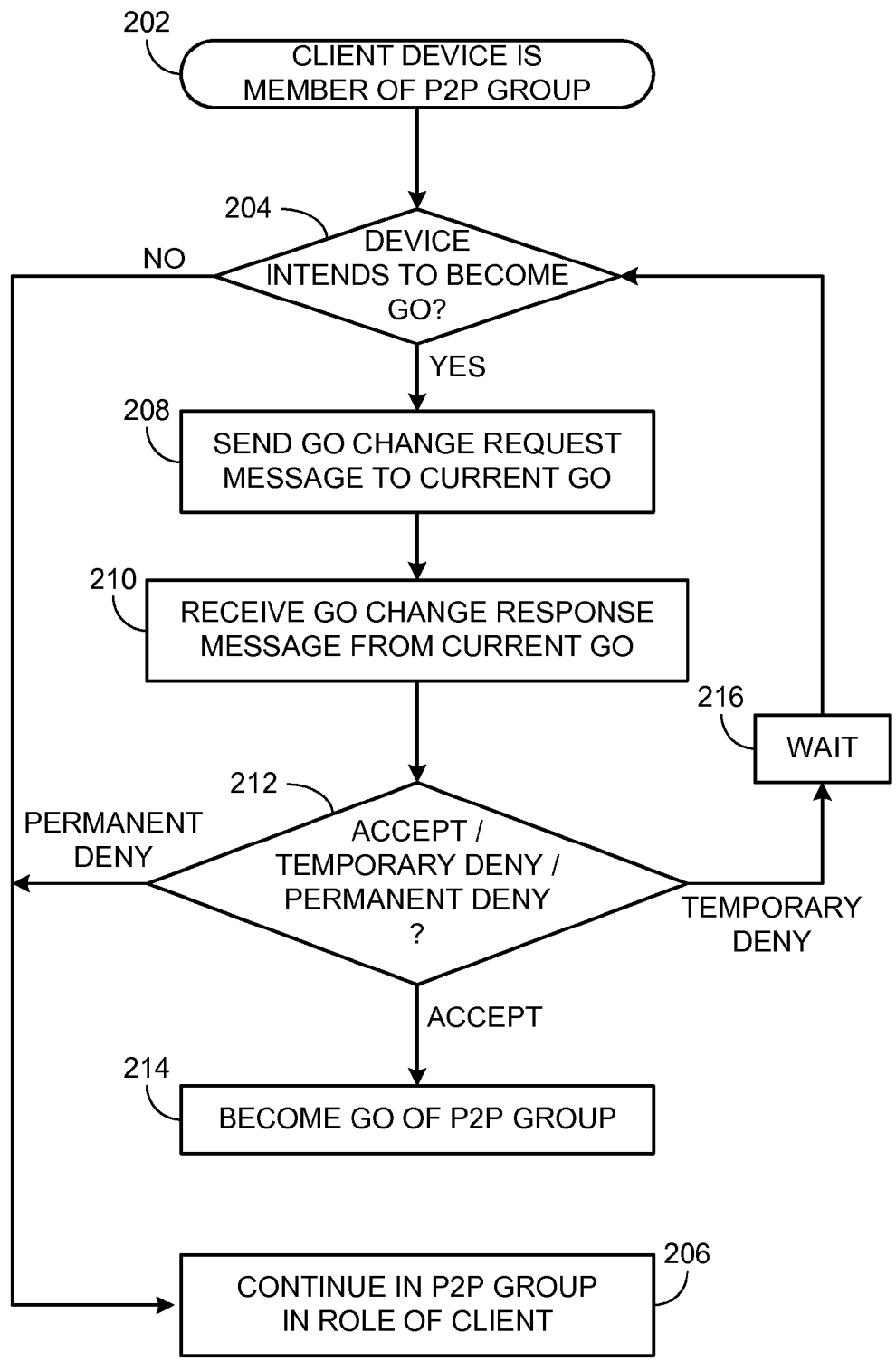
FIG. 7 is a flowchart illustration of a simplified example method performed by a prospective GO device for switching the GO of a P2P group.
Figure 8:
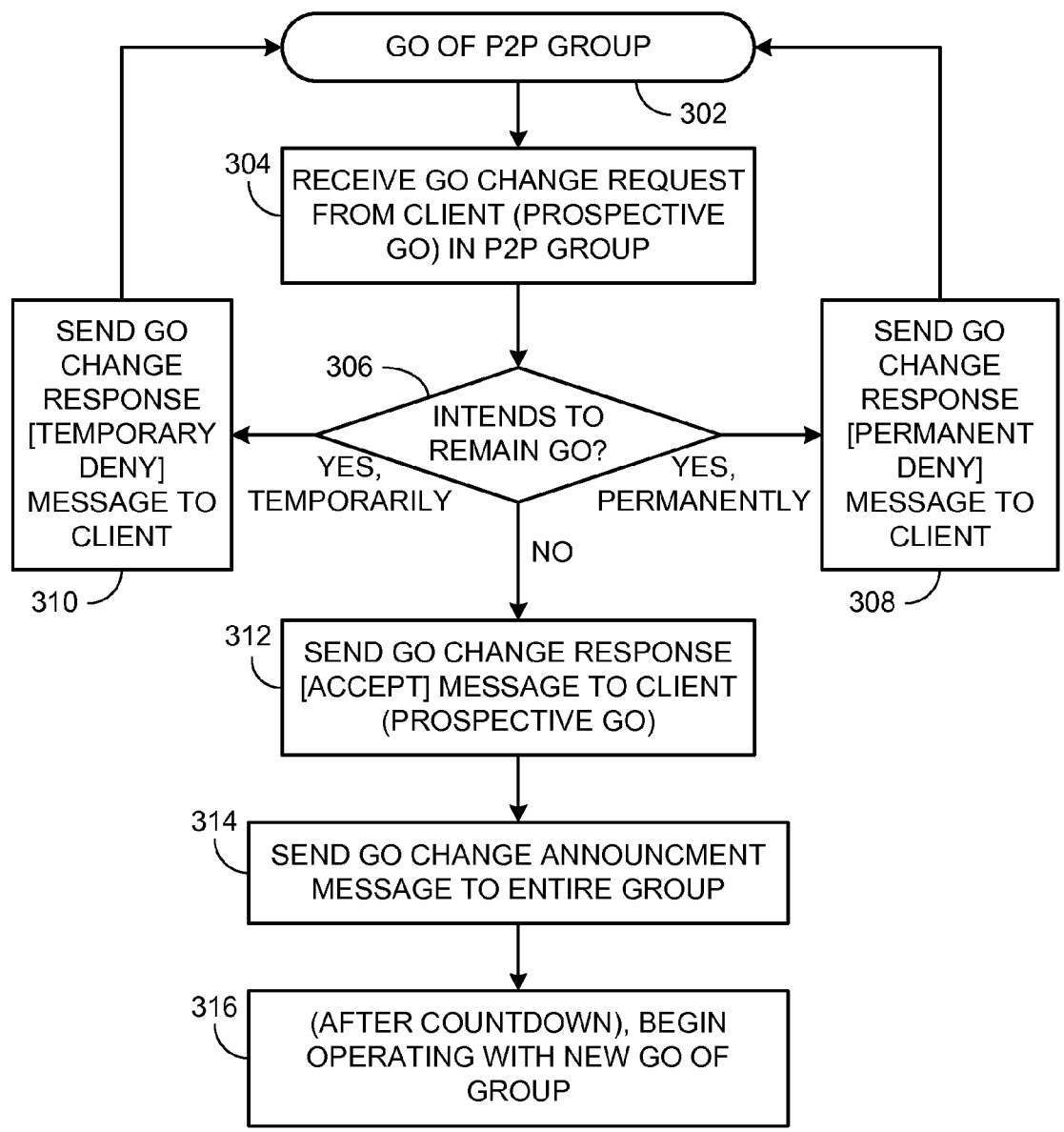
FIG. 8 is a flowchart illustration of a simplified example method performed by a current GO device for switching the GO of a P2P group.
Figure 9:
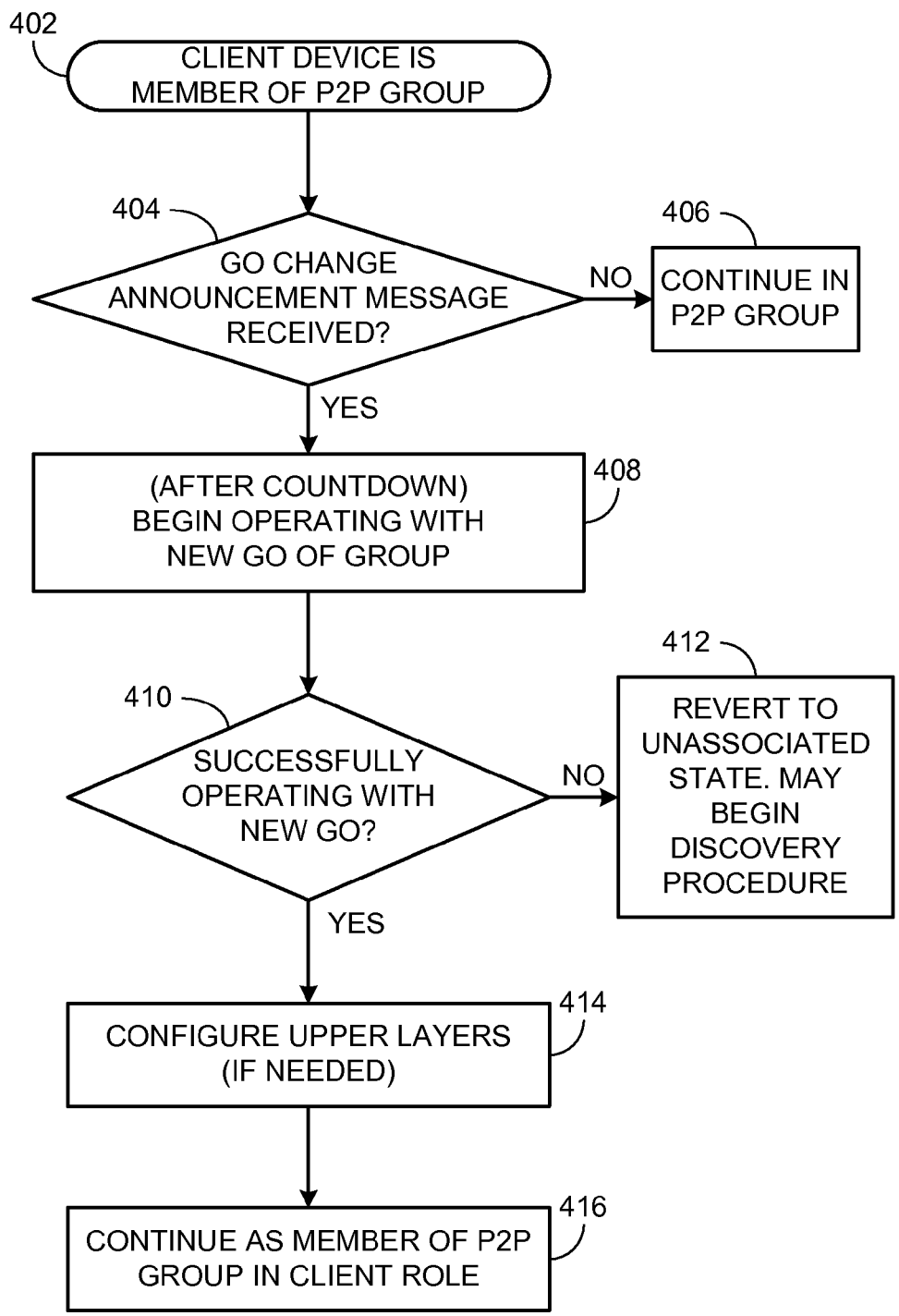
FIG. 9 is a flowchart illustration of a simplified example method performed by a client device in the P2P group for switching to a new GO.

FIG. 7 is a flowchart illustration of a simplified example method performed by the prospective GO device, FIG. 8 is a flowchart illustration of a simplified example method performed by the current GO device, and FIG. 9 is a flowchart illustration of a simplified example method performed by a client device in the P2P group that is not the prospective GO device. The simplified example methods illustrated in FIGS. 7-9 correspond to the example messaging procedure illustrated in FIG. 1 for switching the GO of a P2P group. It is obvious to modify the simplified example methods illustrated in FIGS. 7-9 to correspond to any one of the alternate example messaging procedures illustrated in FIGS. 2-4.

Starting at 202 of FIG. 7, a client device is a member of a P2P group that is already formed, and therefore association has already occurred. If the client device does not intend to take on the role of GO of the P2P group (checked at 204), the client device continues at 206 in the P2P group in the role of client.

However, if the client device is a prospective GO device (that is, intends to become the GO of the P2P group), the client device sends at 208 a GO Change Request message directly to the current GO device requesting to become the GO of the P2P group. Responsive to sending the GO Change Request message, the client device receives at 210 a GO Change Response message directly from the current GO device, the message indicating whether the current GO device accepts or denies the request.

As noted above, the GO Change Response message may include an Accept status or a Temporary Deny status or a Permanent Deny status. There may be additional information in the form of status codes, cause codes or reasons, but the response types can be grouped as temporary or permanent. The type of status is checked at 212. If the GO Change Response message includes an Accept status, the prospective GO device becomes the new GO of the P2P group at 214. As noted above, the new GO may start operating as the GO of the P2P group immediately, or at any time, or at a prescribed time. If the GO Change Response message includes a Permanent Deny status, the prospective GO continues as a member of the P2P group at 206 and is barred from sending a further GO Change Request message in that P2P group. If the GO Change Response message includes a Temporary Deny status, the prospective GO continues as a member of the P2P group and must wait a predetermined amount (at 216) before another attempt to become the GO of the P2P group.

Starting at 302 of FIG. 8, a device is the GO of a P2P group that is already formed, and therefore association has already occurred. At 304, the GO device receives from a client device ("prospective GO device") in the P2P group a GO Change Request message. As noted above, the GO device may accept the request to change the GO to the prospective GO device, or may deny the request, either temporarily or permanently. To determine at 306 how to respond to the request, a number of factors may be taken into consideration. A device configured as incapable of having any role in a P2P group other than GO (for example, a device having a GO Intent value of 15) will deny the request permanently. A device that recently became the GO of the P2P group may deny the request temporarily because changing GOs rapidly may create an unstable ping-pong or round-robin topology. Certain applications or services running on the GO device may affect the determination. The determination to deny permanently or temporarily may be based on the upper layers or upon capabilities of the GO device. For example, if a file transfer operation is in progress, the GO device may temporarily deny the request, and then accept a subsequent GO change request received after the file transfer operation completes.

In the event that the GO device determines to permanently deny the request, the GO device sends at 308 a GO Change Response message including a Permanent Deny status directly to the client device that sent the request, and then the GO device continues operating as the GO of the P2P group at 302.

In the event that the GO device determines to temporarily deny the request, the GO device sends at 310 a GO Change Response message including a Temporary Deny status directly to the client device that sent the request, and then the GO device continues operating as the GO of the P2P group at 302.

In the event that the GO device determines to accept the request, the GO device sends at 312 a GO Change Response message including an Accept status directly to the client device that sent the request, sends at 314 a GO Change Announcement message identifying the prospective GO device to all devices in the P2P group (either as a broadcast or in unicast signaling), and at 316 begins any countdown then switches to use the new GO device of the P2P group.

Starting at 402 of FIG. 9, a client device is a member of a P2P group that is already formed, and therefore association has already occurred.

As long as the client device does not receive a GO Change Announcement message (checked at 404), the client device continues at 406 in the P2P group.

If the client device receives a GO Change Announcement message that identifies a new GO device for the P2P group (checked at 404), then at 408, after any countdown, the client device begins operating with the new GO device. If the client device does not successfully operate with the new GO (checked at 410), then the device reverts at 412 to the unassociated state and may be begin a discovery procedure to find other P2P stations. If the client device successfully operates with the new GO device (checked at 410), then the client device may configure at 414 its upper layers (if appropriate) and then continues at 416 as a client member of the P2P group now operated by the new GO device.

P2P protocol communication is based on the use of P2P Information Element (IE), P2P Action frame, and P2P Public Action frame formats.

This disclosure describes implementing the GO Change Request message, the GO Change Response message, and the GO Change Announcement message as Public Action frames. In particular, the listing of P2P Public Action Frame Types may be modified to include new types for these messages, as noted in TABLE 1 below.

TABLE 1

| P2P Public Action Frame Types | |
|---|---|
| Type | Notes |
| 0 | GO Negotiation Request |
| 1 | GO Negotiation Response |
| 2 | GO Negotiation Confirmation |
| 3 | P2P Invitation Request |
| 4 | P2P Invitation Response |
| 5 | Device Discoverability Request |
| 6 | Device Discoverability Response |
| 7 | Provision Discovery Request |
| 8 | Provision Discovery Response |
| 9 | GO Change Request |
| 10 | GO Change Response |
| 11 | GO Change Announcement |
| 12-255 | Reserved |

P2P Public Action Frames are management frames and may employ the Protected Management Frames features described in the IEEE Std. 802.11™-2012 published 29 Mar. 2012 by IEEE Computer Society. One or more of the GO Change Request frame, the GO Change Response frame, and the GO Change Announcement frame may employ these Protected Management Frames features, using the Code 126 "Vendor-specified Protected) as described in Table 8-38 of the IEEE Std. 802.11™-2012, thereby creating a secure communication to the devices in the P2P group.

As defined in the Wi-Fi® P2P Technical Specification first published in 2010, each Public Action frame includes a P2P IE, which carries one or more P2P attributes. The P2P attributes for the P2P IE in the GO Change Request, GO Change Response, and GO Change Announcement (for the case of broadcast) frames are listed below in TABLES 2, 3, and 4, respectively. The GO Departure Notification message may be effected via a Deauthentication frame, with a Reason Code or Minor Reason Code P2P attribute having a value that indicates to the client devices receiving the frame that the P2P group is to continue operating with an appointed backup GO. The listing of Reason Code definitions may be modified to include this new reason code, as detailed in TABLE 5 below. The listing of Minor Reason Code definitions may be modified to include this new reason code, as detailed in TABLE 6 below.

Most of the P2P attributes that make up the P2P IE in the GO Change Request, CO Change Response, and GO Change Announcement are defined in TABLE 7 of the Wi-Fi® P2P Technical Specification first published in 2010. A single P2P IE carries one or more P2P attributes. This disclosure describes new definitions of P2P attributes GO Change Intent, GO Change Reason, and GO Switch Count Field, as noted in TABLE 7 below.

TABLE 2

P2P Attributes of GO Change Request Frame

| Attributes | Attribute ID | Note |
| --- | --- | --- |
| Configuration Timeout | 5 | The Configuration Timeout attribute shall be present in the P2P IE. |
| GO Change Intent | 19 | The GO Change Intent attribute shall be present in the P2P IE. |
| GO Change Reason | 20 | The GO Change Reason attribute may be present in the P2P IE. |
| Operating Channel | 17 | The Operating Channel attribute may be present in the P2P IE. |
| P2P Group BSSID | 7 | The P2P Group BSSID attribute shall be present in the P2P IE. |
| Channel List | 11 | The Channel List attribute shall be present in the P2P IE. |
| P2P Group ID | 15 | The P2P Group ID attribute shall be present in the P2P IE. |
| P2P Device Info | 13 | The P2P Device Info attribute shall be present in the P2P IE. |

The GO Change Request frame is a unicast message sent from a prospective GO that is a client device in a P2P group to the current GO device of the P2P group. In some implementations, the current GO device of a P2P group may sent the GO Change Request frame as a unicast message to a client device in the P2P group to initiate the GO change process, and the client device receiving the GO Change Request frame responds by sending a new GO Change Request frame to the current GO device.

The GO Change Intent attribute, which is mandatory in the GO Change Request frame, is a number defined similarly to the Group Owner Intent attribute used in GO negotiation. Its purpose is to initiate a renegotiation of the Group Owner. The GO device that receives this value from the client device will compare it to its own value, either or both of which may have changed since the initial GO negotiation. The GO device may use this comparison to decide whether to accept or deny the request to change GO. The GO Change Intent value of a device may change over time based on the state of the device, such as battery level, RSSI or radio performance levels, the nature of applications and services running on the device, or user preferences.

The GO Change Reason attribute, which is optional in the GO Change Request frame, is a cause code to communicate to the current GO why the client device intends to become the GO of the P2P group. It can indicate that the reason it intends to take on the role of GO is that there has been a change in its power situation (for example, the addition of a bigger battery, or a connection to mains), a new application wants to run that needs the different topology, a change in RSSI or radio performance levels, user preference, user request, and the like.

TABLE 3

P2P Attributes of GO Change Response Frame

| Attributes | Attribute ID | Note |
| --- | --- | --- |
| Status | 0 | Shall be set to one of 0, 12, 13 |
| Configuration Timeout | 5 | The Configuration Timeout attribute shall be present in the P2P IE. |
| Operating Channel | 17 | The Operating Channel attribute shall be present in the P2P IE. |
| P2P Group BSSID | 7 | The P2P Group BSSID attribute shall be present in the P2P IE. In the case of a failure status the P2P Group BSSID will remain the P2P Interface address of the existing GO. In the case of a GO Change being accepted, the P2P Group BSSID will be the new BSSID, typically the P2P Interface address of the device receiving this GO Change Response message. |
| Channel List | 11 | The Channel List attribute shall be present in the P2P IE if the Status field is set to "Success". |
| P2P Group Info | 14 | The P2P Group Info attribute shall be present in the P2P IE if the Status field is set to "Success". |

The GO Change Response frame is a unicast message sent from the current GO device to the prospective GO in response to receiving the GO Change Request message. If the response is to proceed with the GO switch, the Status attribute of the GO Change Response frame is set to the status code indicative of success, and a list of devices in the group is presented in the P2P Group Info attribute. If the response is to deny the request for a GO switch, the status is set to one of the codes that indicate failure. In particular, the listing of Status Code definitions may be modified to include new failure codes for these messages, as detailed in TABLE 8 below.

TABLE 4

P2P Attributes of GO Change Announcement Broadcast Frame

| Attributes | Attribute ID | Note |
| --- | --- | --- |
| Configuration Timeout | 5 | The Configuration Timeout attribute shall be present in the P2P IE. |
| Invitation Flags | 18 | The Invitation Flags attribute shall be present in the P2P IE. |
| Operating Channel | 17 | The Operating Channel attribute shall be present in the P2P IE. |

TABLE 4-continued

P2P Attributes of GO Change Announcement Broadcast Frame

| Attributes | Attribute ID | Note |
|---|---|---|
| P2P Group BSSID | 7 | The P2P Group BSSID attribute shall be present in the P2P IE. Note: In this case the P2P Group BSSID informs the clients of the new GO. |
| Channel List | 11 | The Channel List attribute shall be present in the P2P IE. |
| P2P Group ID | 15 | The P2P Group ID attribute shall be present in the P2P IE. |
| P2P Device Info | 13 | The P2P Device Info attribute shall be present in the P2P IE. |
| GO Switch Count Field | 21 | Value of 0 indicates the GO switch occurs any time after the GO Change Announcement is transmitted. Value of 1 indicates the GO switch occurs immediately before the next target beacon transmission time (TBTT). Other value indicates the number of target beacon transmission times (TBTTs) until the GO Switch. |

The GO Change Announcement frame is a broadcast message sent from the current GO device instructing all devices in the P2P group to move operation over the prospective GO device. A client device in the P2P group that receives the GO Change Announcement may start to operate with the new GO device by listening for beacons on the operating channel identified in the Operating Channel attribute, and may send any traffic with the BSSID identified in the P2P Group BSSID attribute.

The GO Switch Count Field attribute, which is mandatory in the GO Change Announcement frame, is a number used to indicate the timing of the switch to the new GO. A value of 0 indicates the GO switch occurs any time after the GO Change Announcement frame is transmitted. A value of 1 indicates the GO switch indicates the GO switch occurs immediately before the next target beacon transmission time (TBTT). Other values indicate the number of TBTTs until the GO switch.

According to the Wi-Fi P2P Technical Specification first published in 2010, if an orderly shutdown of a P2P Group is possible, the GO may send a Deauthentication Frame to the broadcast address or to all connected clients. This deauthentication frame contains a specific reason code indicating the GO is leaving. If the GO is departing from the P2P Group but instead of shutting down the group entirely, wants the Group to continue operating with an appointed backup GO this can be done by sending the deauthentication frame with a reason code that specifies that. In other words, the GO Departure Notification message may be effected via a Deauthentication frame, with a Reason Code or Minor Reason Code P2P attribute having a value that indicates to the client devices receiving the frame that the P2P group is to continue operating with an appointed backup GO. It may also be the case that having previously appointed a Backup GO the group will automatically move to the Backup GO without any specific indication at the time the GO leaves the group. The listing of Reason Code definitions may be modified to include this new reason code, as detailed in TABLE 5 below. The listing of Minor Reason Code definitions may be modified to include this new reason code, as detailed in TABLE 6 below.

TABLE 5

Reason Code definitions

| Reason Code | Description |
|---|---|
| 0 | Reserved |
| 1 | Unspecified reason |
| 2 | Previous authentication no longer valid |
| 3 | Deauthenticated because sending STA is leaving (or has left) IBSS or BSS |
| 4 | Disassociated due to inactivity |
| ... | ... |
| 68 | GO Departure, fall back on backup GO |
| 104-65535 | Reserved |

TABLE 6

Minor Reason Code definitions

| Minor Reason Code | Description |
|---|---|
| 0 | Reserved |
| 1 | Disassociated/deauthenticated from the WLAN AP because the Cross Connection capability bit is 1 and this capability within this device is outside the IT defined policy. Note: this may be the returned reason code independent of the value of the P2P Infrastructure Managed capability setting. |
| 2 | Disassociated/deauthenticated from the WLAN AP because the P2P Infrastructure Managed bit is 0. |
| 3 | Disassociated/deauthenticated from the WLAN because a P2P Concurrent Device is not setting P2P Coexistence Parameters within the IT defined policy; this applies to either primary or secondary P2P Coexistence Parameters. |
| 4 | Disassociated/deauthenticated from the WLAN AP because the P2P Device has included the P2P IE with the P2P Infrastructure Managed bit set to 1 and P2P operation within this device is outside the IT defined policy. |
| 5 | GO Departure, fall back on backup GO |
| 6-255 | Reserved |

Another method of the GO to inform the clients that it is leaving is that the GO initiates the GO Change procedure and hands off the GO role to another device in the Group. The target of the GO Change procedure can be the Backup GO. After completion of a successful GO Change Procedure the GO can leave the Group and it will continue to operate.

TABLE 7

P2P Attribute ID definitions

| Attribute ID | Notes |
|---|---|
| 0 | Status |
| 1 | Minor Reason Code |
| 2 | P2P Capability |
| 3 | P2P Device ID |
| 4 | Group Owner Intent |
| 5 | Configuration Timeout |
| 6 | Listen Channel |
| 7 | P2P Group BSSID |
| 8 | Extended Listen Timing |
| 9 | Intended P2P Interface Address |
| 10 | P2P Manageability |
| 11 | Channel List |
| 12 | Notice of Absence |
| 13 | P2P Device Info |

TABLE 7-continued

P2P Attribute ID definitions

| Attribute ID | Notes |
|---|---|
| 14 | P2P Group Info |
| 15 | P2P Group ID |
| 16 | P2P Interface |
| 17 | Operating Channel |
| 18 | Invitation Flags |
| 19 | GO Change Intent |
| 20 | GO Change Reason |
| 21 | GO Switch Count Field |
| 22-220 | Reserved |
| 221 | Vendor specific attribute |

TABLE 8

Status Code definitions

| Status Code | Description |
|---|---|
| 0 | Success |
| 1 | Fail; information is currently unavailable. |
| 2 | Fail; incompatible parameters. |
| 3 | Fail; limit reached. |
| 4 | Fail; invalid parameters. |
| 5 | Fail; unable to accommodate request. |
| 6 | Fail; previous protocol error, or disruptive behavior. |
| 7 | Fail; no common channels. |
| 8 | Fail; unknown P2P Group |
| 9 | Fail; both P2P Devices indicated an Intent of 15 in Group Owner Negotiation. |
| 10 | Fail; incompatible provisioning method. |
| 11 | Fail; rejected by user. |
| 12 | Fail; permanent GO change denial |
| 13 | Fail; temporary GO change denial |
| 14-255 | Reserved |

The Status attribute of the GO Change Response frame is set to the status code indicative of success or failure. The prospective GO will change its behavior based on the code that it receives. In particular, the prospective GO may retry to take on the role of GO after a status code indicative of a temporary denial (example status code value of 13), but may not retry after a status code indicative of a permanent denial (example status code value of 12). The temporary denial may be defined such that a client may not send another request for a specific length of time. This may be a fixed length, or may involve a back-off algorithm where each successive denial causes the client to not send another request for a longer interval. In one example of a back-off algorithm each successive interval may be exponentially longer than the previous interval.

The P2P Capability attribute contains a set of parameters that can be used to establish a P2P connection. The format of the P2P Capability attribute is described in Table 11 of the Wi-Fi® P2P Technical Specifications first published in 2010. The P2P Capability attribute includes a Device Capability Bitmap field, which is a set of parameters indicating a P2P device's capabilities. This disclosure describes a definition of the Device Capability Bitmap field, which is described in Table 12 of the Wi-Fi® P2P Technical Specifications first published in 2010, be extended to include an indication of whether the device is capable of performing a GO Change procedure or not, as detailed in TABLE 9 below.

TABLE 9

Device Capability Bitmap definition

| Bit | Information | Notes |
|---|---|---|
| 0 | Service Discovery | The Service Discovery field shall be set to 1 if the P2P Device supports Service Discovery, and is set to 0 otherwise. |
| 1 | P2P Client Discoverability | Within a P2P Group Info attribute and a (Re)association request frame the P2P Client Discoverability field shall be set to 1 when the P2P Device supports P2P Client Discoverability, and is set to 0 otherwise. This field shall be reserved and set to 0 in all other frames or uses. |
| 2 | Concurrent Operation | The Concurrent Operation field shall be set to 1 when the P2P Device supports Concurrent Operation with WLAN, and is set to 0 otherwise. |
| 3 | P2P Infrastructure Managed | The P2P Infrastructure Managed field shall be set to 1 when the P2P interface of the P2P Device is capable of being managed by the WLAN (infrastructure network) based on P2P Coexistence Parameters, and set to 0 otherwise. |
| 4 | P2P Device Limit | The P2P Device Limit field shall be set to 1 when the P2P Device is unable to participate in additional P2P Groups, and set to 0 otherwise. |

TABLE 9-continued

Device Capability Bitmap definition

| Bit | Information | Notes |
| --- | --- | --- |
| 5 | P2P Invitation Procedure | The P2P Invitation Procedure field shall be set to 1 if the P2P Device is capable of processing P2P Invitation signaling, and set to 0 otherwise. |
| 6 | GO Change Procedure | The GO Change Procedure field shall be set to 1 if the P2P Device is capable of performing a GO Change Procedure, and set to 0 otherwise. |
| 7 | Reserved | — |

In the case where a device is not capable of performing a GO Change Procedure, other members of the group can change behavior based on the state of this bit. For example, if the GO device does not support the GO Change Procedure, the client devices should not send a GO Change Request message to the GO device. If a GO Change Request is occurring and there is a device incapable of GO Change Procedure in the P2P group, additional operations may be necessary to assist this device in staying within the P2P group, or at least have a method to quickly reconnect after the change occurs. This could, for example, involve a P2P Invitation Request from the new GO after the GO Change procedure completes.

Note that in the above tables the Type, Attribute ID, Status Code and Bit values presented are examples. They need to be defined and always presented as a consistent number, but that definition is not restricted to the numbers given in this disclosure.

Figure 10:
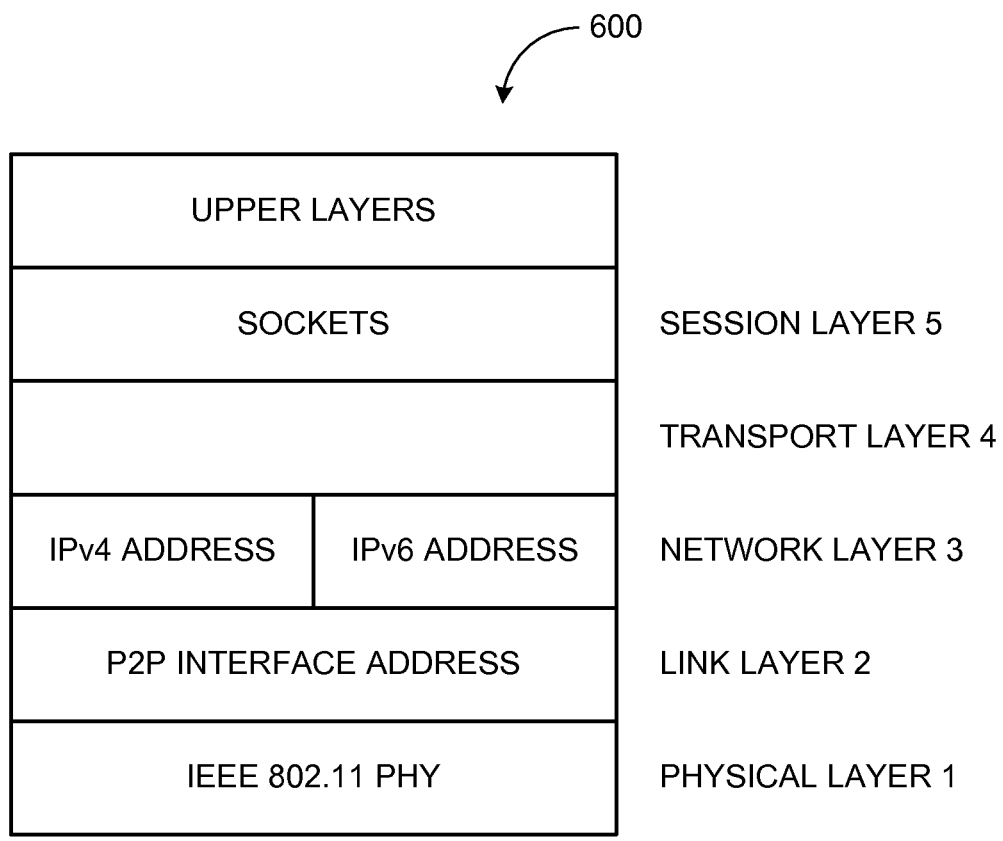
FIG. 10 illustrates addressing at different layers of a communication stack.

FIG. 10 illustrates the different types of addresses used at different levels of a communication stack 600. Within a P2P group (at Link-Layer-2 of the communication stack 600), devices are identified by a P2P interface address (also known as a virtual Media Access Control (MAC) address). When operating in a P2P group, each device generates its own P2P interface address. At Network-Layer-3 of the communication stack 600, Internet Protocol (IP) addresses conforming to IPv4 or IPv6 may be used.

This disclosure describes that in the event of a switch in GO, or a merger of P2P groups, or a split of a P2P group into multiple individual P2P groups, the devices retain their P2P interface addresses. The GO Change Procedure allows the P2P Group BSSID to change from the P2P interface address of the current GO device to that of the new GO device.

If IPv6 link-local addressing is employed (each device generates its IPv6 address from its P2P interface address), then no changes to IPv6 addressing are required in the event of a GO switch, a P2P group merger, or a split of P2P groups. Even in the case of a merger of P2P groups, the likelihood of a collision in IPv6 link-local addresses is extremely low. A client on an IPv6 local network uses the Neighbor Discovery Protocol (NDP) to discover other network nodes and maintains an internal P2P-interface-address-to-IPv6-address mapping table. Thus, by having the devices retain their P2P interface addresses throughout the change in topology of P2P groups, the P2P-interface-address-to-IPv6-address mapping tables require no changes and are maintained. Accordingly, the changes to topology of one or more P2P groups discussed in this disclosure are conducted whilst maintaining the upper layer state of the members of the P2P groups, thus achieving continuity above the link layer.

If IPv4 addressing is employed, the situation may be more complex. IPv4 addresses are assigned to members of the P2P group by a Dynamic Host Configuration Protocol (DHCP) server, which is typically on the GO device. The DHCP server maintains a list of leases, which contains the list of IPv4 addresses it has assigned and for how long they are assigned. A client on an IPv4 local network uses Address Resolution Protocol (ARP) to discover other network nodes and maintains an internal P2P-interface-address-to-IPv4-address mapping table.

Consider the situation of a GO switch within a P2P group from a current GO device to a new GO device. Preferably, the new GO device starts running a DHCP server when it starts to operate in the role of GO of the P2P group. Any legacy client devices in the P2P group (that is, client devices that do not support GO switching) will likely release their IPv4 addresses when the current GO ceases to operate as the GO of the P2P group and will renew their IPv4 addresses with the new GO device after connecting to the P2P group following the GO switch.

The assigned IPv4 addresses of devices in the P2P group and their lease details may be transmitted from the previous GO device to the new GO device, and the new GO device may update its DHCP server with those assigned addresses and their lease details. The client devices in the P2P group may be notified whether or not the assigned IPv4 addresses and their lease details were actually transmitted to the new GO device, the notification being effect in an advertisement (or otherwise signaled). Client devices that have been informed that the assigned IPv4 addresses and their lease details were actually transmitted to the new GO device may refrain from releasing and renewing their IPv4 addresses.

Alternatively, the devices in the P2P group may use Address Resolution Protocol (ARP) announcements, also known as Gratuitous ARP, to maintain an internal P2P-interface-address-to-IPv4-address mapping table for all other devices in the P2P group. If one of the client devices in the P2P group then takes on the role of GO, that new GO device already knows the IPv4 address assignments and can use it to update its DHCP server. If, in this case, the additional information about DHCP leases such as lease duration is not known to the new GO device, the new GO device can nevertheless use knowledge of the currently-assigned IPv4 addresses for future requests to provide continuity. For example, if a client device in the P2P group initiates a DHCP renew, the DHCP server at the new GO device can assign to that client device the same IPv4 address as previously used for that client device.

A P2P group that has precisely two devices that undergoes a GO switch is a special case. Both devices in that P2P group know the P2P interface address and the IPv4 address of the other device. (The current GO device knows the IPv4 address of all client devices in the P2P group, and the sole client device knows the IPv4 address of the GO device.) Thus each of the two devices in the P2P group maintains a complete P2P-interface-address-to-IPv4-address mapping table. There is no need to change the addressing at Link-Layer-2 or at Network-Layer-3. The current GO device may inform the prospective GO device that there are only two devices in the P2P group, for example, by means of explicit signaling such as in the GO Change Announcement. Alternatively, the prospective GO device may implicitly determine that there are only two devices in the P2P group from the list of members of the P2P group provided by the current GO device (i.e. in the P2P Group Info element of the GO Change Response frame).

The treatment of IPv4 addresses for the situation of a P2P group splitting into multiple independent P2P groups is similar to that described above for the situation of a GO switch.

Consider now the situation of multiple P2P groups merging into a single P2P group. It may be possible for the various devices in the multiple P2P groups to merge without making any changes to the IPv4 addresses. In that case, the treatment of IPv4 addresses for the situation of a merger of P2P groups is similar to that described above for the situation of a GO switch. However, special considerations must be made for devices that are on different subnets and devices in different P2P groups that are assigned the same IPv4 address.

As an example of two devices assigned the same IPv4 address, a first device in a first P2P group may have been assigned the IPv4 address 192.168.0.2 by the DHCP server of the first P2P group, and a second device in a second P2P group may have been assigned the IPv4 address 192.168.0.2 by the DHCP server of the second P2P group. When the second P2P group is merged into the first P2P group, there is a problem because two devices in the same P2P group cannot be assigned the same IPv4 address.

Accordingly, this disclosure describes that, following a merger of P2P groups, a device conducts an appropriate procedure to detect whether the IPv4 address assigned to the device prior to the merge is still valid in the merged P2P group. For example, the device may use ARP to detect that there are two nodes with the same IPv4 address on the local network. In the case where a device finds itself on a new network (after a P2P group merge) and its IPv4 address is no longer valid, that device may send a DHCP Renew command to the DHCP server of the merged P2P group, which will result in that device being assigned a new IPv4 address that is unique on the local network.

Figure 11:
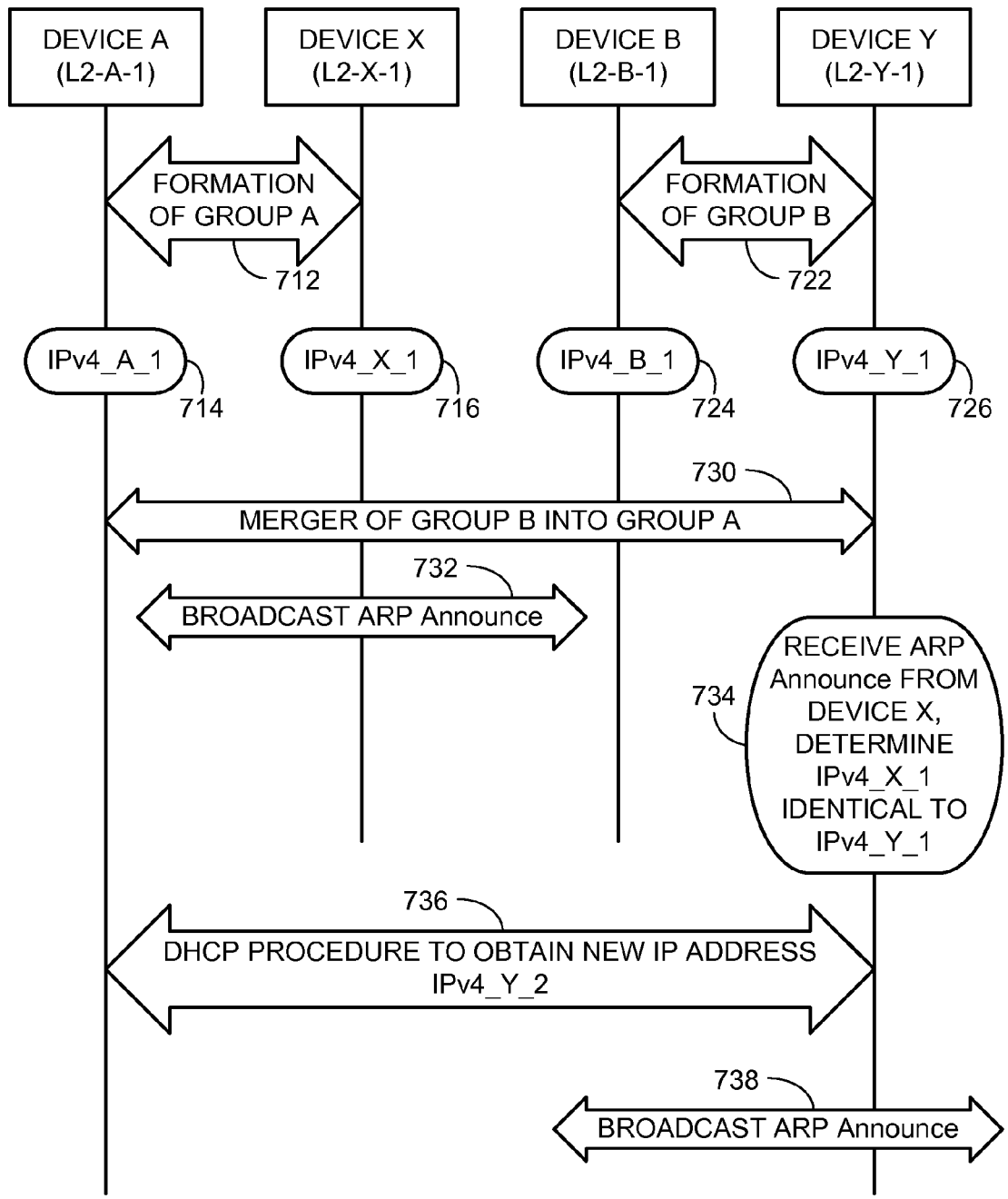
FIG. 11 is an example messaging diagram for merger of two P2P groups in which devices are assigned the same IPv4 address.

This is illustrated in FIG. 11, which is an example messaging diagram for merger of two P2P groups in which devices are assigned the same IPv4 address. A device A has a P2P interface address L2-A-1, and a device X has a P2P interface address L2-X-1. Following formation of a first P2P group ("Group A") at 712, with the device A acting as the GO, a DHCP server at the device A assigns at 714 an IPv4 address IPv4_A_1 to the device A and assigns at 716 an IPv4 address IPv4_X_1 to the device X. Similarly, a device B has a P2P interface address L2-B-1, and a device Y has a P2P interface address L2-Y-1. Following formation of a second P2P group ("Group B") at 722, with the device B acting as the GO, a DHCP server at the device B assigns at 724 an IPv4 address IPv4_B_1 to the device B and assigns at 726 an IPv4 address IPv4_Y_1 to the device Y.

Following the merging of the second group B into the first group A at 730, the device X transmits an ARP announcement at 732. The ARP announcement indicates the P2P interface address and the IPv4 address of the device X. The device Y, upon receiving the ARP announcement at 734, determines that the IPv4 address of the device X (IPv4_X_1) is identical to its IPv4 address (IPv4_Y_1). Consequently, the device Y undertakes at 736 a DHCP procedure with the device A, which is the GO of the merged group, to obtain a new IPv4 address. The new IPv4 address assigned to the device Y is denoted IPv4_Y_2. The device Y may then transmit an ARP announcement at 738 indicating the correspondence of its P2P interface address and the new IPv4 address assigned to the device Y.

As an example of different subnets, devices in a first P2P group may have IPv4 addresses of the form 10.n.n.n, whereas devices in a second P2P group may have IPv4 addresses of the form 192.168.n.n. After the second P2P group has merged into the first P2P group, all devices must be on the same subnet. In such cases, not all devices can continue in the merged P2P group with the same IPv4 addresses assigned to them in the original multiple P2P groups.

Figure 12:
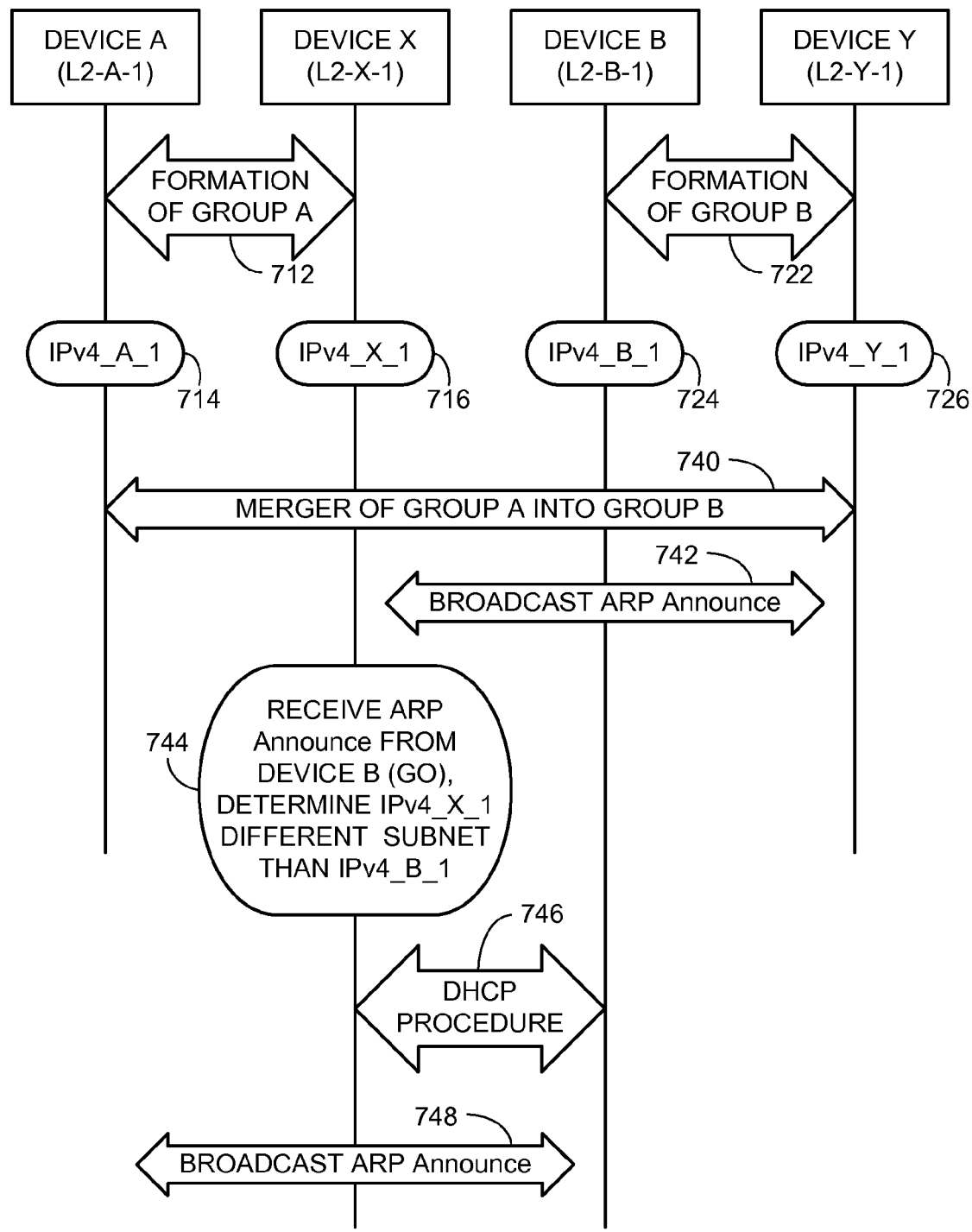
FIG. 12 is an example messaging diagram for merger of two P2P groups in which devices belong to different subnets.

This is illustrated in FIG. 12, which is an example messaging diagram for merger of two P2P groups in which devices belong to different subnets. A device A has a P2P interface address L2-A-1, and a device X has a P2P interface address L2-X-1. Following formation of a first P2P group ("Group A") at 712, with the device A acting as the GO, a DHCP server at the device A assigns at 714 the IPv4 address IPv4_A_1 to the device A and assigns at 716 an IPv4 address IPv4_X_1 to the device X. Similarly, a device B has a P2P interface address L2-B-1, and a device Y has a P2P interface address L2-Y-1. Following formation of a second P2P group ("Group B") at 722, with the device B acting as the GO, a DHCP server at the device B assigns at 724 an IPv4 address IPv4_B_1 to the device B and assigns at 726 an IPv4 address IPv4_Y_1 to the device Y.

Following the merging of the first group A into the second group B at 740, the device B, which is the GO of the merged group, transmits an ARP announcement at 742. The ARP announcement indicates the P2P interface address and the IPv4 address of the device B. The device X, upon receiving the ARP announcement at 744, determines that the IPv4 address of the device B (IPv4_B_1) and its IPv4 address (IPv4_X_1) are in different subnets. Thus the IPv4 address assigned to the device X is invalid in the merged Group B. Consequently, the device X undertakes at 746 a DHCP procedure with the device B, which is the GO of the merged group, to obtain a new IPv4 address. The new IPv4 address assigned to the device X is denoted IPv4_X_2. The device X may then transmit an ARP announcement at 748 indicating the correspondence of its P2P interface address and the new IPv4 address assigned to the device X.

Continuity Above IP Layer

Service continuity (or in general, continuity above the IP Layer) may be achieved in spite of the risk of IP address changes, by the device (for example, as part of the operating system and/or device drivers managing the P2P group connection(s)) by, for example, maintaining a mapping between the P2P interface addresses (which do not change as a result of the group topology change) and the appropriate upper layer "connections" (which may be exposed to third party or other software as 'sockets' or pointers to 'connections'). Alternatively (or additionally), the IP address of a device belonging to a P2P group and/or peer service may be updated based on the ARP procedure described above with respect to FIG. 11 and FIG. 12. As such, data being passed from upper layer services or software and being associated to a particular service on a device (the association having been initiated prior to the topology change) may be routed correctly (that is, by having the updated IP address of the device transmitted within the P2P frames).

Figure 13:
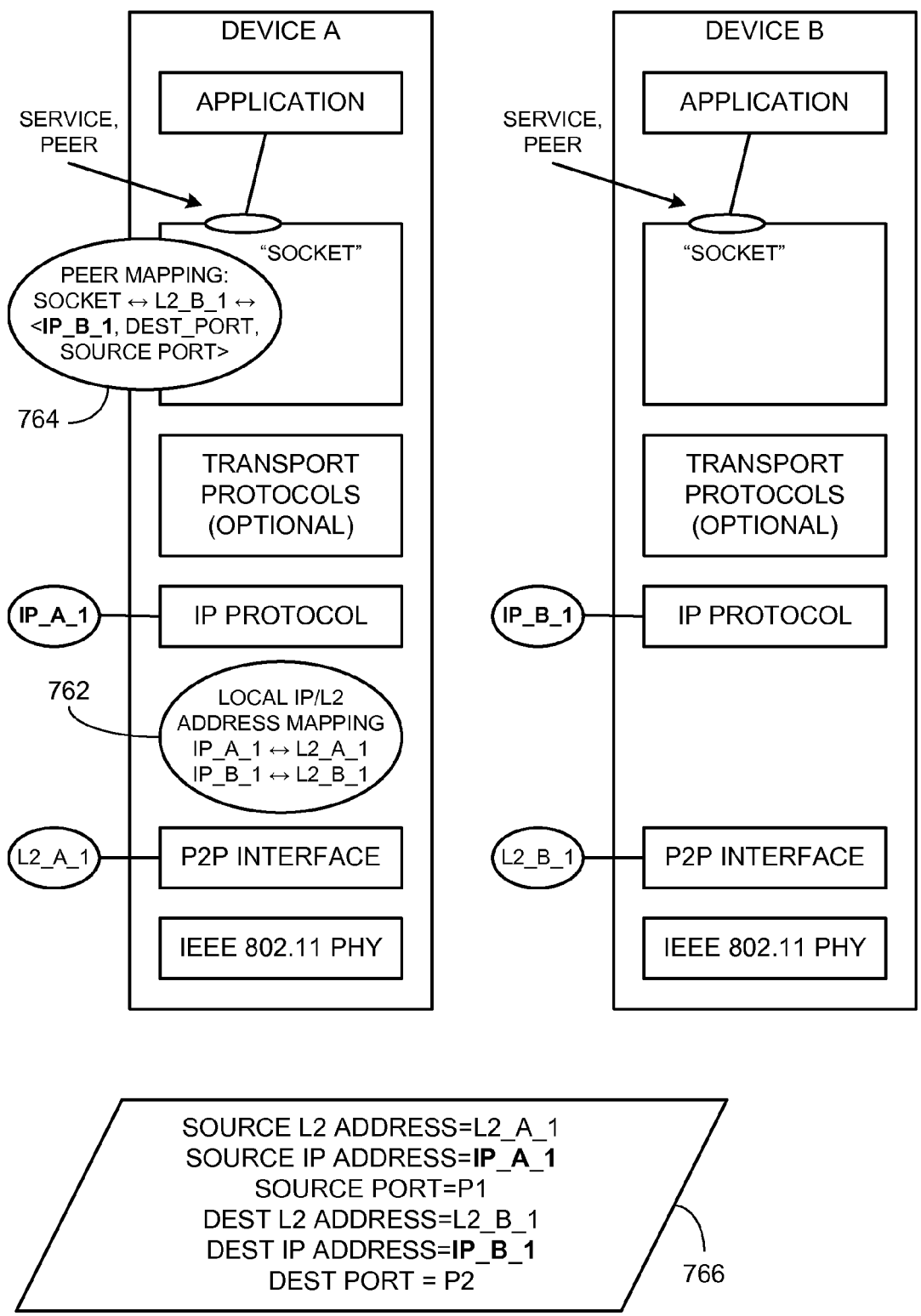
FIG. 13 and FIG. 14 illustrate addressing at different layers of a communication stack for communications between two devices, prior to and after a change in IP addressing due to a change in group topology.
Figure 14:
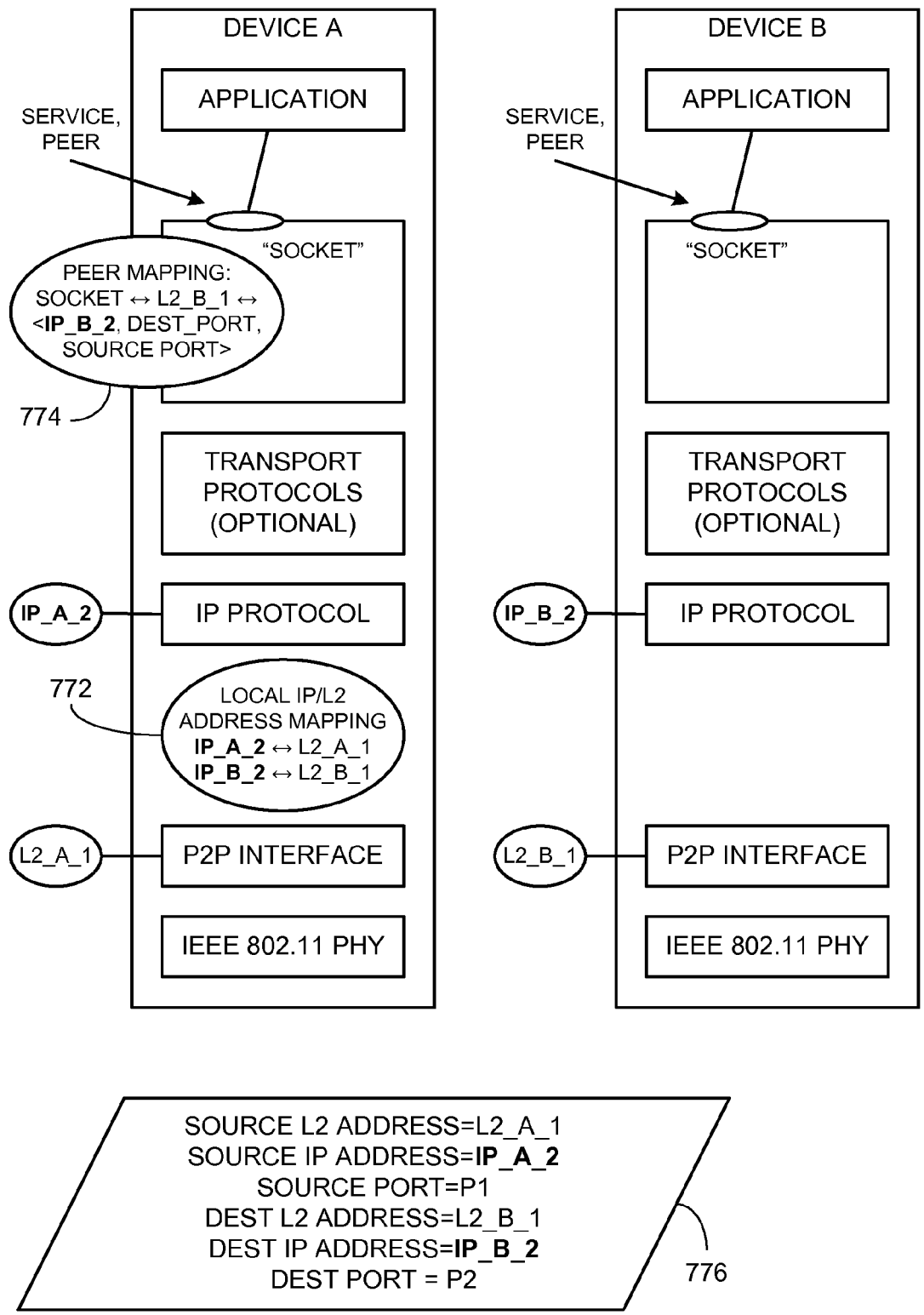

This ability to provide service continuity is described with respect to FIG. 13 and FIG. 14, which illustrate addressing at different layers of a communication stack for communications between a device A and a device B. FIG. 13 illustrates the addressing prior to a change in P2P group topology, and FIG. 14 illustrates the addressing following the change in P2P group topology. Prior to the change in P2P group topology, the IPv4 addresses assigned to the device A and to the device B are IP_A_1 and IP_B_1, respectively. Following the change, the IPv4 addresses assigned to the device A and to the device B are IP_A_2 and IP_B_2, respectively.

The device A maintains a local mapping (referenced 762 in FIG. 13) of IP address to P2P interface address, which, prior to the change in P2P group topology, maps the IPv4 address IP_A_1 to the P2P address L2_A_1 of the device A, and maps the IPv4 address IP_B_1 to the P2P address L2_B_1 of the device B.

Following discovery of the devices in the P2P group to which the device A belongs, the operating system of the device A provides a list of peer devices in the group and the services offered by those devices. The list may be in the form <peer, service>. An application at the device A may request a socket for the device B and a particular service offered by the device B, meaning that it wishes to open a connection to device B for the purpose of using the particular service. The socket address is a combination of the device B's IPv4 address IP_B_1, a destination port number P2 and a source port number P1.

The device A may maintain a peer mapping of the socket to the P2P interface address of the destination (which is the device B). Prior to the change in P2P group topology, the peer mapping (referenced 764 in FIG. 13) maps the P2P interface address L2_B_1 to the socket address (the IPv4 address IP_B_1, the destination port number P2 and the source port number P1).

A packet to be sent from the device A (source) to the device B (destination) therefore includes P2P addresses for the source and the destination at Link-Layer-2 of the communication stack, IP addresses for the source and the destination at Network-Layer-3 of the communication stack, and port numbers of the sockets at the source and at the destination. Prior to the change in P2P group topology, a packet 766 (FIG. 13) to be sent from the device A to the device B includes the addresses L2_A_1, IP_A_1, L2_B_1, IP_B_1, and the port numbers P1 and P2.

Following the change in P2P group topology and the assignment of new IPv4 addresses, ARP announcements or similar messaging enables the device A to update its local mapping (referenced 772 in FIG. 14) of IP address to P2P interface address, so that it maps the IPv4 address IP_A_2 to the P2P address L2_A_1 of the device A, and maps the IPv4 address IP_B_2 to the P2P address L2_B_1 of the device B.

Because the device A maintains a peer mapping of the socket to the P2P interface address of the destination, the device A may update its socket address with the new IPv4 address that is mapped to the P2P address L2_B_1 of the device B. That is, the device A may update its peer mapping (referenced 774 in FIG. 14) so that the socket address uses the newly assigned IPv4 address IP_B_2 of the device B.

Following the change, a packet 776 (FIG. 14) to be sent from the device A to the device B includes the addresses L2_A_1, IP_A_2, L2_B_1, IP_B_2, and the port numbers P1 and P2.

Although the IP address of a device in a P2P group may change due to a change in P2P group topology, the P2P interface address and the socket port number need not change. The device maintains a mapping of "peer identity" to (at least) the P2P interface address of a peer device. This mapping may be indirect, for example, by means of intermediate mappings. Optionally, for ongoing connections, the devices may maintain a mapping of "connection" (which may be exposed to upper layers and/or applications, for example, in a means similar to a "socket") to at least source port, destination port, and P2P interface address.

In order to construct packets destined for identified peer devices, it is in any case necessary to maintain a "peer identity"-to-destination IP address mapping. Because the P2P interface address of the peer device does not change, the device can determine the new IP address of a previously-known peer device using the mapping of "peer identity" to P2P interface address. As such, a device can initiate a connection with a previously known peer device within the group (for example, in response to a request from an application or upper layer), maintaining any device identification used at the upper layer or at the application. Furthermore, for ongoing connections, the devices may assume that port numbers used for UDP or TCP connections do not change at the P2P group topology change. In this case, the ongoing connections can continue after the P2P group topology change, transparently to layers above the IP protocol.

Unlike many network-based services today, services or applications using Wi-Fi Direct™ functionality will not be exposed to the IP addresses of either the host device or its peer devices, and as such should not be sensitive to address changes at the IP layer or at lower layers. However, the upper layers could be notified of a change of IP address associated with a peer device (for example, on a per-connection, per-socket, or per-device basis).

Figure 15:
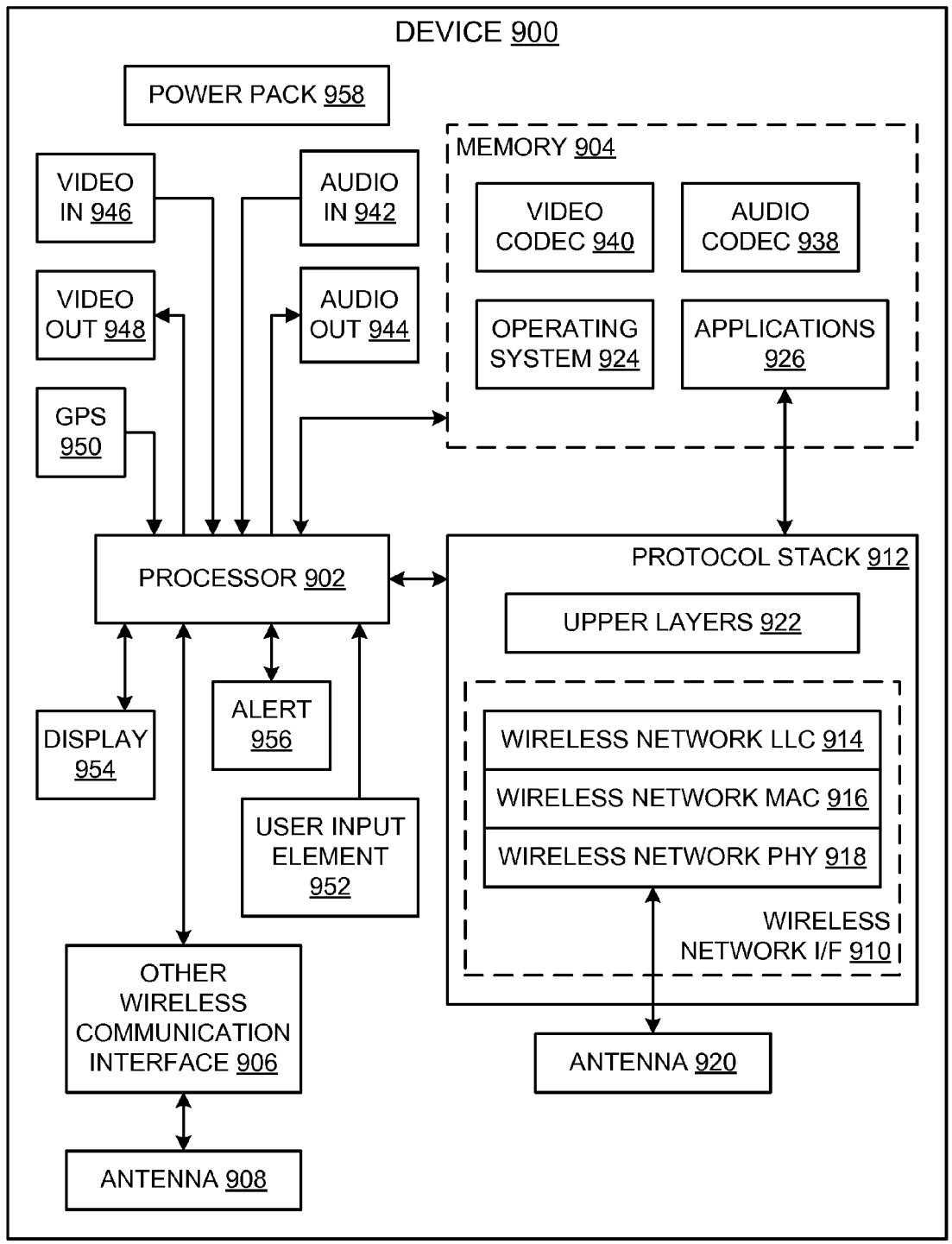
FIG. 15 is a block diagram of an example device.

FIG. 15 is a block diagram of an example device 900. A device 900 comprises a processor 902 coupled to a memory 904 and optionally to one or more other wireless communication interfaces 906. For example, wireless communication interfaces 906 may comprise a short-range wireless communication interface such as a wireless personal area network interface. In another example, wireless communication interfaces 906 may comprise a wireless wide area network (WWAN) interface such as for cellular communications. One or more antennas 908 may be coupled to respective ones of the wireless communication interfaces 906. An antenna may be shared among more than one wireless interface.

The device 900 also comprises a wireless network interface 910 within a protocol stack 912 that is coupled to processor 902. The wireless network interface 910 comprises a physical layer 1 module 918, a MAC module 916 at a lower sub-layer of layer 2, and an LLC module 914 at an upper sub-layer of layer 2. The device 900 also comprises an antenna 920 coupled to the physical layer 1 module 918. The protocol stack 912 may comprise upper layers 922.

The processor 902 may be configured to perform any of the methods and procedures and techniques described in this disclosure. The MAC module 916 may be compatible with the P2P mechanisms and procedures described in this disclosure. The upper layers 922 may be configured to map addresses as described in this disclosure, to provide service continuity following a change in P2P group topology involving the device 900.

The memory 904 may store an operating system 924 to be executed by the processor 902. The memory 904 may store applications 926 installed in the device 900 be executed by the processor 902. The memory 904 may also store data (not shown) used by operating system 924 and applications 926.

The memory 904 may store an audio coder-decoder (codec) 938 or a video codec 940 or both. The device 900 may comprise an audio input element 942 and an audio output element 944, both coupled to the processor 902. The device 900 may comprise a video input element 946 and a video output element 948, both coupled to the processor 902.

The device 900 may comprise a Global Positioning System (GPS) module 950 coupled to the processor 902.

The device 900 may comprise one or more user input elements 952 coupled to the processor 902. Examples of user input elements include a keyboard, a keypad, a touchscreen, a joystick, a thumbwheel, a roller, a touchpad, a trackpad, a capacitive touch pad, an optical touch pad, and any other type of navigation actuator.

The device 900 may comprise one or more user output elements coupled to the processor 902, of which a display 954 is illustrated. In the event that the display 954 is a touchscreen, it functions also as a user input element.

The device 900 may comprise one or more alert components 956 coupled to the processor 902, to be activated in order to alert a user, for example, by sounding a buzzer, playing a ringtone, emanating light, or vibrating.

The device 900 may include mechanical interfaces, such as a power connector jack, a data interface port such as a Universal Serial Bus (USB) port, a headphone jack, and other mechanical interfaces that are not explicitly shown.

The device 900 may comprise a power pack 958 that provides power to the other components of the device 900.

The device 900 may comprise other elements that, for clarity, are not illustrated in FIG. 15. Likewise, the device 900 may comprise a subset of the elements illustrated in FIG. 15.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method for taking on a role of group owner in a peer-to-peer (P2P) group, the method comprising:
   sending a request message to a device in the P2P group that currently has the role of group owner, the request message including a request to take on the role of group owner;
   receiving from the device a response message in response to the request message, the response message including an indication that the request is accepted;
   receiving from the group owner a message listing devices in the P2P group that the group owner is prepared to relinquish;
   initiating a P2P invitation procedure to selected ones of the devices listed in the message to join a new P2P group separate from the P2P group;
   assuming the role of group owner of the P2P group, wherein the P2P group is split into multiple P2P groups in response to the group owner going out of radio range with respect to one or more devices in the P2P group; and
   wherein the request message and the response message are Public Action frames.

2. A method for splitting an original peer-to-peer (P2P) group into multiple P2P groups, each with its own group owner, the method performed by a client device of the original P2P group, the method comprising:
   sending a message to a group owner of the original P2P group requesting a split of the original P2P group, wherein the P2P group is split into multiple P2P groups in response to the group owner going out of radio range with respect to one or more devices in the P2P group;
   responsive to sending the message requesting the split, receiving from the group owner a message listing devices in the original P2P group that the group owner is prepared to relinquish;
   initiating a P2P invitation procedure to selected ones of the devices listed in the message to join a new P2P group separate from the original P2P group while operating as a group owner of the new P2P group; and
   receiving from at least one of the selected ones of the devices a response to the P2P invitation.

3. A device comprising:
   a processor; and
   a wireless network interface coupled to the processor, the wireless network interface configured to:
      send a message to a group owner of an original peer-to-peer (P2P) group requesting a split of the original P2P group, wherein the device is a client in the original P2P group, wherein the P2P group is split into multiple P2P groups in response to the group owner going out of radio range with respect to one or more devices in the P2P group;
      responsive to sending the message requesting the split, receive from the group owner a message listing devices in the original P2P group that the group owner is prepared to relinquish;
      initiate a P2P invitation procedure to selected ones of the devices listed in the message to join a new P2P group separate from the original P2P group while operating as a group owner of the P2P group; and
      receive from at least one of the selected ones of the devices a response to the P2P invitation.

* * * * *